US012812652B2

(12) United States Patent
Eberlein et al.

(10) Patent No.: US 12,812,652 B2
(45) Date of Patent: Nov. 24, 2026

(54) APPARATUS AND METHOD FOR PROVIDING A MODIFIED OFDM FRAME STRUCTURE

(71) Applicant: Fraunhofer-Gesellschaft zur Foerderung der angewandten Forschung e.V., Munich (DE)

(72) Inventors: Ernst Eberlein, Erlangen (DE); Mohammad Alawieh, Erlangen (DE); Birendra Ghimire, Erlangen (DE); Norbert Franke, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 255 days.

(21) Appl. No.: 18/398,790

(22) Filed: Dec. 28, 2023

(65) Prior Publication Data

US 2024/0283581 A1 Aug. 22, 2024

Related U.S. Application Data

(63) Continuation of application No. PCT/EP2022/067724, filed on Jun. 28, 2022.

(30) Foreign Application Priority Data

Jun. 30, 2021 (EP) .................................... 21182860

(51) Int. Cl.
*H04W 72/23* (2023.01)
*H04W 64/00* (2009.01)
(Continued)

(52) U.S. Cl.
CPC ........... *H04W 72/23* (2023.01); *H04W 64/00* (2013.01); *H04W 72/121* (2013.01); *H04W 72/1273* (2013.01)

(58) Field of Classification Search
CPC ....... H04L 5/0007; H04L 5/0048–0053; H04L 5/0091–0098; H04L 27/2602;
(Continued)

(56) References Cited

U.S. PATENT DOCUMENTS 11,665,687 B2 * 5/2023 Manolakos ........... H04L 27/261 370/252
12,082,223 B2 * 9/2024 Franke .................. H04L 5/0053
(Continued)

FOREIGN PATENT DOCUMENTS

CN 107889212 A 4/2018
EP 3817263 A1 5/2021
(Continued)

OTHER PUBLICATIONS

3GPP, "Technical Specification Group Radio Access Network; NR; User Equipment (UE) radio transmission and reception; Part 1: Range 1 Standalone (Release 17)", TS38.101-1, Rel. 17, v17.1.0 (Mar. 2021) (512 pp.), Mar. 2021, 361 pp. Uploaded in two parts.
(Continued)

*Primary Examiner* — Brendan Y Higa
(74) *Attorney, Agent, or Firm* — ASHURST PERKINS COIE US LLP; Michael A. Glenn

(57) ABSTRACT

An apparatus for transmitting and/or for receiving a signal in a wireless communication system according to an embodiment is provided. The signal is a data signal or is a positioning reference signal. The apparatus is configured to transmit and/or to receive the data signal or the positioning reference signal in a frame, wherein the frame comprises a plurality of OFDM symbols, wherein each of the plurality of OFDM symbols comprises a plurality of resource elements, wherein each of the plurality of resource elements of each of the plurality of OFDM symbols is assigned to one of a plurality of subcarriers. The plurality of OFDM symbols are
(Continued)

arranged in the frame such that the frame comprises a plurality of groups, wherein each of the plurality of groups comprises two or more consecutive OFDM symbols of the plurality of OFDM symbols of the frame. No cyclic prefix is arranged between the two or more consecutive OFDM symbols of each of the plurality of groups.

26 Claims, 20 Drawing Sheets

(51) Int. Cl.
*H04W 72/121* (2023.01)
*H04W 72/1273* (2023.01)

(58) Field of Classification Search
CPC .... H04L 27/26035; H04W 72/04–446; H04W 72/121; H04W 64/00–006; H04W 72/1273; H04W 72/20; H04W 72/23–232; H04W 72/25; H04W 72/27; H04W 72/29
See application file for complete search history.

(56) References Cited

U.S. PATENT DOCUMENTS

| | | | | |
|---|---|---|---|---|
| 12,470,342 | B2 * | 11/2025 | Bao | H04L 5/0094 |
| 2018/0302198 | A1 * | 10/2018 | Wang | H04L 5/0007 |
| 2020/0229125 | A1 * | 7/2020 | Manolakos | H04W 24/10 |
| 2020/0267683 | A1 * | 8/2020 | Edge | G01S 13/767 |
| 2021/0136787 | A1 * | 5/2021 | Opshaug | A61F 5/005 |
| 2021/0235304 | A1 * | 7/2021 | Akkarakaran | H04L 27/261 |
| 2021/0337531 | A1 * | 10/2021 | Manolakos | H04W 64/00 |
| 2021/0360577 | A1 * | 11/2021 | Manolakos | H04W 24/10 |
| 2022/0095296 | A1 * | 3/2022 | Franke | G01S 5/0236 |

FOREIGN PATENT DOCUMENTS

| | | | |
|---|---|---|---|
| EP | 3833058 | A1 | 6/2021 |
| KR | 20090097543 | A | 9/2009 |

OTHER PUBLICATIONS

Ericsson, "NB-IoT—NB-PUSCH design", 3GPP Draft; RI-160085—NB-IOT—NB-PUSCH Design, vol. RAN WGI, No. Budapest, HU; Jan. 18, 2016-Jan. 20, 2016, XP051064700, Jan. 12, 2016, 7 pp.
Ericsson, "PRACH Design for Enhanced LAA", 3GPP Draft; R1-163146, vol. RANWG1, No. Busan, Korea; Apr. 11, 2016-Apr. 15, 2016, XP051080562, Apr. 2, 2016, 6 pp.
ETSI, "TS 38.331 v 16.1.0, 5G; NR; Radio Resource Control (RRC); Protocol specification", (3GPP TS 38.331 version 16.1.0 Release 16) (886 pp.), Jul. 2020, 668 pp. Uploaded in two parts.
ETSI, "TS 137 355 V16.1.0 (Jul. 2020, LTE; 5G; LTE Positioning Protocol (LPP)", (3GPP TS37.355 version 16.1.0 Release 16), Jul. 2020, 294 pp.
ETSI, "TS 138 213 V16.4.0 (Jan. 2021) 5G; NR; Physical layer procedures for control", 3GPP TS 38.213 version 16.4.0 Release 16, Jan. 2021, 185 pp.
ETSI, "TS 38.455 v16.0.0 5G; NG-RAN; NR Positioning Protocol A (NRPPa)", (3GPP TS38.455 version 16.0.0 Release 16), Sep. 2020, 61 pp.
Fraunhofer IIS, et al., "Aspects of UL-based NR positioning techniques", 3GPPDRAFT; R1-1901183_NR_POSITIONING_UL, vol. RAN WG1, No. Taipei, Taiwan;Jan. 21, 2019-Jan. 25, 2019, XP051594026, Jan. 20, 2019, 8 pp.
Fraunhofer IIS, et al., "Uplink NR TDOA Design", 3GPP Draft; R1-1903053_NR_UTDOA, vol. RAN WG1, No. Athens, Greece; Feb. 25, 2019-Mar. 1, 2019, XP051600749, Feb. 15, 2019, 16 pp.
Intel Corporation, "PRACH Design for eLAA", 3GPP Draft; RI-162358, vol. RAN WGI, No. Busan, Korea; Apr. 11, 2016-Apr. 15, 2016, XP051080137, Apr. 2, 2016, 5 pp.
Kong, Dejin, et al., "A CP Reduction Scheme Based on Symbol Repetition for Narrow-Band IoT Systems", IEEE Internet of Things Journal, IEEE,USA, vol. 8, No. 16, XP011870543, pp. 12880-128891.
Kong, Dejin, et al., "Reduction of Cyclic Prefix Overhead in Narrow-Band Internet of Things (NB-IoT) Systems", IEEE Wireless Communications Letters, IEEE, Piscataway, NJ, USA, vol. 10, No. 3, XP011841842, pp. 517-521.

* cited by examiner

APPARATUS AND METHOD FOR PROVIDING A MODIFIED OFDM FRAME STRUCTURE

CROSS-REFERENCES TO RELATED APPLICATIONS

This application is a continuation of copending International Application No. PCT/EP2022/067724, filed Jun. 28, 2022, which is incorporated herein by reference in its entirety, and additionally claims priority from European Application No. EP 21 182 860.3, filed Jun. 30, 2021, which is incorporated herein by reference in its entirety.

The present invention relates to the field of wireless communication systems or networks, more specifically to an apparatus and a method for providing a modified OFDM frame structure.

BACKGROUND OF THE INVENTION

FIG. 1 is a schematic representation of an example of a terrestrial wireless network 100 including, as is shown in FIG. 1(*a*), the core network and one or more radio access networks $RAN_1$, $RAN_2$, . . . $RAN_N$ (RAN=Radio Access Network). FIG. 1(*b*) is a schematic representation of an example of a radio access network $RAN_n$ that may include one or more base stations $gNB_1$ to $gNB_5$ (gNB=next generation Node B), each serving a specific area surrounding the base station schematically represented by respective cells $\mathbf{106}_1$ to $\mathbf{106}_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT (Internet of Things) devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, (UE=User Equipment) also referred to as user equipment, UE, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base stations $gNB_1$ to $gNB_5$ may be connected to the core network 102, e.g. via the S1 interface, via respective backhaul links $\mathbf{114}_1$ to $\mathbf{114}_5$, which are schematically represented in FIG. 1(*b*) by the arrows pointing to “core”. The core network 102 may be connected to one or more external networks. The external network may be the Internet or a private network, such as an intranet or any other type of campus networks, e.g. a private WiFi or 4G or 5G mobile communication system. Further, some or all of the respective base stations $gNB_1$ to $gNB_5$ may be connected, e.g. via the S1 or X2 interface or the XN interface in NR (New Radio), with each other via respective backhaul links $\mathbf{116}_1$ to $\mathbf{116}_5$, which are schematically represented in FIG. 1(*b*) by the arrows pointing to “gNBs”. A sidelink channel allows direct communication between UEs, also referred to as device-to-device, D2D (Device to Device), communication. The sidelink interface in 3GPP (3G Partnership Project) is named PC5 (Proximity-based Communication 5).

For data transmission a physical resource grid may be used. The physical resource grid may comprise a set of resource elements to which various physical channels and physical signals are mapped. For example, the physical channels may include the physical downlink, uplink and sidelink shared channels, PDSCH (Physical Downlink Shared CHannel), PUSCH (Physical Uplink Shared Channel), PSSCH (Physical Sidelink Shared Channel), carrying user specific data, also referred to as downlink, uplink and sidelink payload data, the physical broadcast channel, PBCH (Physical Broadcast Channel), carrying for example a master information block, MIB, and one or more of a system information block, SIB, one or more sidelink information blocks, SLIBs, if supported, the physical downlink, uplink and sidelink control channels, PDCCH (Physical Downlink Control Channel), PUCCH (Physical Uplink Control CHannel), PSCCH (Physical Sidelink Control Channel), the downlink control information, DCI, the uplink control information, UCI, and the sidelink control information, SCI, and physical sidelink feedback channels, PSFCH (Physical sidelink feedback channel), carrying PC5 feedback responses. Note, the sidelink interface may support a 2-stage SCI (Speech Call Items). This refers to a first control region comprising some parts of the SCI, and, optionally, a second control region, which comprises a second part of control information.

For the uplink, the physical channels may further include the physical random-access channel, PRACH (Packet Random Access Channel) or RACH (Random Access Channel), used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols (OFDM=Orthogonal Frequency-Division Multiplexing) depending on the cyclic prefix, CP, length. A frame may also include of a smaller number of OFDM symbols, e.g. when utilizing a shortened transmission time interval, sTTI (slot or subslot transmission time interval), or a mini-slot/non-slot-based frame structure comprising just a few OFDM symbols.

The wireless communication system may be any single-tone or multicarrier system using frequency-division multiplexing, like orthogonal frequency-division multiplexing, OFDM, or orthogonal frequency-division multiple access, OFDMA (Orthogonal frequency-division multiple access), or any other IFFT-based signal (IFFT=Inverse Fast Fourier Transformation) with or without CP, e.g. DFT-s-OFDM (DFT=discrete Fourier transform). Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base stations $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, or roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels.

In a wireless communication network, like the one depicted in FIG. 1, it may be desired to locate a UE with a certain accuracy, e.g., determine a position of the UE in a cell. Several positioning approaches are known, like satellite-based positioning approaches, e.g., autonomous and assisted global navigation satellite systems, A-GNSS, such as GPS, mobile radio cellular positioning approaches, e.g., observed time difference of arrival, OTDOA, and enhanced cell ID, E-CID, or combinations thereof.

It is noted that the information in the above section is only for enhancing the understanding of the background of the invention and, therefore, it may comprise information that does not form conventional technology that is already known to a person of ordinary skill in the art.

Starting from the above, there may be a need for improvements or enhancements for a wireless communication system or network and its components.

SUMMARY

An embodiment may have a first user equipment for receiving data in a wireless communication system, wherein the first user equipment is configured to receive a positioning reference signal over one or more resources, wherein the first user equipment is one of a plurality of user equipments of the wireless communication system, wherein each of the plurality of user equipments is assigned to a group of two or more groups, wherein each of the plurality of groups comprises two or more of the plurality of user equipments, wherein the first user equipment is configured to receive a configuration message indicating, for each resource element of a plurality of resource elements, which group of the two or more groups is to access said resource element, wherein the first user equipment is configured to receive the positioning reference signal, and is configured to access only those of the plurality of resource elements to which the user equipment belongs according to the configuration information.

Another embodiment may have a network entity for a wireless communication system, wherein the network entity is configured to transmit a configuration message over one or more first resources to a plurality of user equipments of the wireless communication system, wherein the configuration message comprises configuration information indicating one or more second resources, wherein the configuration information is suitable to be employed by the plurality of user equipments for receiving a positioning reference signal over the one or more second resources, wherein each of the plurality of user equipments is assigned to a group of two or more groups, wherein each of the plurality of groups comprises two or more of the plurality of user equipments, wherein the configuration message specifies, for each resource element of a plurality of resource elements, the user equipments of which group of the two or more groups shall access said resource element.

Another embodiment may have a wireless communication system, comprising: a first user equipment according to the invention, and a network entity according to the invention, wherein the network entity is configured to transmit the configuration message to the first user equipment.

Another embodiment may have a method for receiving data by a first user equipment in a wireless communication system, wherein the first user equipment receives a positioning reference signal over one or more resources, wherein the first user equipment is one of a plurality of user equipments of the wireless communication system, wherein the first user equipment is assigned to a group of two or more groups, wherein each of the plurality of groups comprises two or more of the plurality of user equipments, wherein the first user equipment receives a configuration message indicating, for each resource element of a plurality of resource elements, which group of the two or more groups is to access said resource element, wherein the first user equipment receives the positioning reference signal, and is configured accesses only those of the plurality of resource elements to which the user equipment belongs according to the configuration information.

Another embodiment may have a method for a wireless communication system, wherein a network entity transmits a configuration message over one or more first resources to a plurality of user equipments of the wireless communication system, wherein the configuration message comprises configuration information indicating one or more second resources, wherein the configuration information is suitable to be employed by the plurality of user equipments for receiving a positioning reference signal over the one or more second resources, wherein each of the plurality of user equipments is assigned to a group of two or more groups, wherein each of the plurality of groups comprises two or more of the plurality of user equipments, wherein the configuration message specifies, for each resource element of a plurality of resource elements, the user equipments of which group of the two or more groups shall access said resource element.

Another embodiment may have a non-transitory digital storage medium having a computer program stored thereon to perform the method for receiving data by a first user equipment in a wireless communication system, wherein the first user equipment receives a positioning reference signal over one or more resources, wherein the first user equipment is one of a plurality of user equipments of the wireless communication system, wherein the first user equipment is assigned to a group of two or more groups, wherein each of the plurality of groups comprises two or more of the plurality of user equipments, wherein the first user equipment receives a configuration message indicating, for each resource element of a plurality of resource elements, which group of the two or more groups is to access said resource element, wherein the first user equipment receives the positioning reference signal, and is configured accesses only those of the plurality of resource elements to which the user equipment belongs according to the configuration information, when said computer program is run by a computer.

Another embodiment may have a non-transitory digital storage medium having a computer program stored thereon to perform the method for a wireless communication system, wherein a network entity transmits a configuration message over one or more first resources to a plurality of user equipments of the wireless communication system, wherein the configuration message comprises configuration information indicating one or more second resources, wherein the configuration information is suitable to be employed by the plurality of user equipments for receiving a positioning reference signal over the one or more second resources, wherein each of the plurality of user equipments is assigned to a group of two or more groups, wherein each of the plurality of groups comprises two or more of the plurality of user equipments, wherein the configuration message specifies, for each resource element of a plurality of resource elements, the user equipments of which group of the two or more groups shall access said resource element, when said computer program is run by a computer.

An apparatus for transmitting and/or for receiving a signal in a wireless communication system according to an embodiment is provided. The signal is a data signal or is a positioning reference signal. The apparatus is configured to transmit and/or to receive the data signal or the positioning reference signal in a frame, wherein the frame comprises a plurality of OFDM symbols, wherein each of the plurality of OFDM symbols comprises a plurality of resource elements, wherein each of the plurality of resource elements of each of the plurality of OFDM symbols is assigned to one of a plurality of subcarriers. The plurality of OFDM symbols are arranged in the frame such that the frame comprises a plurality of groups (e.g., bundles), wherein each of the plurality of groups comprises two or more consecutive OFDM symbols of the plurality of OFDM symbols of the frame. No cyclic prefix is arranged between the two or more consecutive OFDM symbols of each of the plurality of groups.

Moreover, an apparatus of a wireless communication system according to an embodiment is provided. The apparatus is configured to determine a slot configuration comprising a plurality of OFDM symbols. Moreover, the apparatus is configured to determine one or more cyclic prefix parameters associated with a group of consecutive OFDM symbols for the slot configuration; wherein at least one OFDM symbol in the slot is not directly preceded by a cyclic prefix. The apparatus is configured to select the slot structure for communicating data, and/or control information and/or positioning information depending on the slot configuration.

Furthermore, a signal or a data frame for being transmitted in a wireless communication system according to an embodiment is provided. The signal is a data signal or is a positioning reference signal. The signal or the data frame comprises a plurality of OFDM symbols, wherein each of the plurality of OFDM symbols comprises a plurality of resource elements, wherein each of the plurality of resource elements of each of the plurality of OFDM symbols is assigned to one of a plurality of subcarriers. The plurality of OFDM symbols are arranged in the signal or the data frame such that the signal or the data frame comprises a plurality of groups, wherein each of the plurality of groups comprises two or more consecutive OFDM symbols of the plurality of OFDM symbols of the signal or the data frame. No cyclic prefix is arranged between the two or more consecutive OFDM symbols of each of the plurality of groups.

Moreover, a first user equipment for transmitting and receiving data in a wireless communication system according to an embodiment is provided. The first user equipment is configured to transmit and/or to receive a positioning reference signal over the one or more second resources. Moreover, the first user equipment is one of a plurality of user equipments of the wireless communication system. Each of the plurality of user equipments is assigned to a group of two or more groups, wherein each of the plurality of groups comprises two or more of the plurality of user equipments. The first user equipment is configured to receive a configuration message indicating, for each resource element of a plurality of resource elements, which group of the two or more groups is allowed to access said resource element. Moreover, the first user equipment is configured to transmit and/or to receive the positioning reference signal by only using one of those of the plurality of resource elements, for which the configuration information indicates that the group to which the user equipment belongs is allowed to access.

Furthermore, a network entity for a wireless communication system according to an embodiment is provided. The network entity is configured to transmit a configuration message over one or more first resources to a plurality of user equipments of the wireless communication system, wherein the configuration message comprises configuration information indicating one or more second resources, wherein the configuration information is suitable to be employed by the plurality of user equipments for transmitting or for receiving a positioning reference signal over the one or more second resources. Each of the plurality of user equipments is assigned to a group of two or more groups, wherein each of the plurality of groups comprises two or more of the plurality of user equipments. The configuration message specifies, for each resource element of a plurality of resource elements, which group of the two or more groups is allowed to access said resource element.

Moreover, a method for transmitting and/or for receiving a signal by an apparatus of a wireless communication system according to an embodiment is provided. The signal is a data signal or is a positioning reference signal. The apparatus transmits and/or receives the data signal or the positioning reference signal in a frame, wherein the frame comprises a plurality of OFDM symbols, wherein each of the plurality of OFDM symbols comprises a plurality of resource elements, wherein each of the plurality of resource elements of each of the plurality of OFDM symbols is assigned to one of a plurality of subcarriers. The plurality of OFDM symbols are arranged in the frame such that the frame comprises a plurality of groups, wherein each of the plurality of groups comprises two or more consecutive OFDM symbols of the plurality of OFDM symbols of the frame. No cyclic prefix is arranged between the two or more consecutive OFDM symbols of each of the plurality of groups.

Furthermore, a method for a wireless communication system according to an embodiment is provided. An apparatus determines a slot configuration comprising a plurality of OFDM symbols. The apparatus determines one or more cyclic prefix parameters associated with a group of consecutive OFDM symbols for the slot configuration; wherein at least one OFDM symbol in the slot is not directly preceded by a cyclic prefix. The apparatus selects the slot structure for communicating data, and/or control information and/or positioning information depending on the slot configuration.

Moreover, a method for transmitting and receiving data by a first user equipment in a wireless communication system is provided. The first user equipment transmits and/or receives a positioning reference signal over the one or more second resources. The first user equipment is one of a plurality of user equipments of the wireless communication system. Moreover, the first user equipment is assigned to a group of two or more groups, wherein each of the plurality of groups comprises two or more of the plurality of user equipments. Furthermore, the first user equipment receives a configuration message indicating, for each resource element of a plurality of resource elements, which group of the two or more groups is allowed to access said resource element. Moreover, the first user equipment transmits and/or receives the positioning reference signal by only using one of those of the plurality of resource elements, for which the configuration information indicates that the group to which the user equipment belongs is allowed to access.

Moreover, a method for a wireless communication system according to an embodiment is provided. A network entity transmits a configuration message over one or more first resources to a plurality of user equipments of the wireless communication system, wherein the configuration message comprises configuration information indicating one or more second resources, wherein the configuration information is suitable to be employed by the plurality of user equipments for transmitting or for receiving a positioning reference signal over the one or more second resources. Each of the plurality of user equipments is assigned to a group of two or more groups, wherein each of the plurality of groups comprises two or more of the plurality of user equipments. The configuration message specifies, for each resource element of a plurality of resource elements, which group of the two or more groups is allowed to access said resource element.

Furthermore, a non-transitory computer program product comprising a computer readable medium storing instructions which, when executed on a computer, perform one of the above described methods is provided.

Further particular embodiments are provided in the dependent claims.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
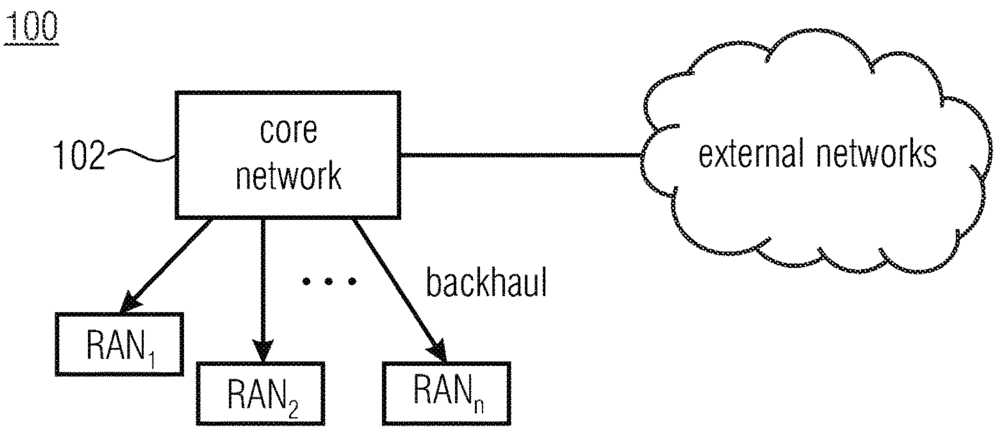
FIG. 1*a-b* illustrates a schematic representation of an example of a terrestrial wireless network.
Figure 1B:
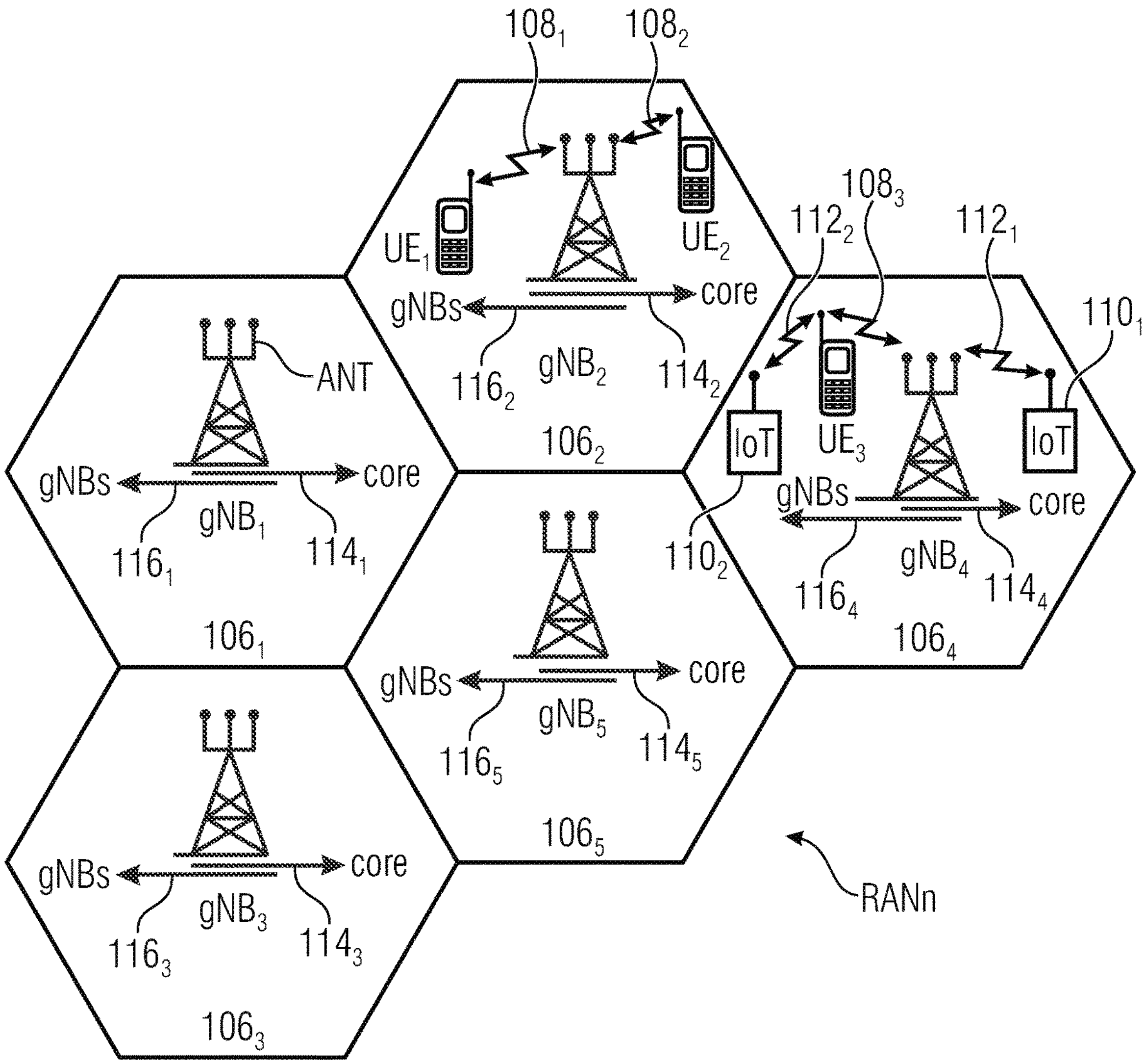

Embodiments of the present invention are now described in more detail with reference to the accompanying drawings, in which the same or similar elements have the same reference signs assigned.

An apparatus for transmitting and/or for receiving a signal in a wireless communication system according to an embodiment is provided. The signal is a data signal or is a positioning reference signal.

The apparatus is configured to transmit and/or to receive the data signal or the positioning reference signal in a frame, wherein the frame comprises a plurality of OFDM symbols, wherein each of the plurality of OFDM symbols comprises a plurality of resource elements, wherein each of the plurality of resource elements of each of the plurality of OFDM symbols is assigned to one of a plurality of subcarriers.

The plurality of OFDM symbols are arranged in frames. A frame may include subframes or slots. In the following we use frames as generic term for frame, subframe or slot. A frame comprises a plurality of groups, wherein each of the plurality of groups comprises two or more consecutive OFDM symbols of the plurality of OFDM symbols of the frame.

No cyclic prefix is arranged between the two or more consecutive OFDM symbols of each of the plurality of groups.

According to an embodiment, no samples, e.g. guard intervals, are arranged between the two or more consecutive OFDM symbols of each of the plurality of groups.

According to an embodiment, each group of at least one of the groups comprises a common cyclic prefix at the beginning of said group.

In an embodiment, no cyclic prefix exists between at least two of the groups (e.g., bundles).

According to an embodiment, the apparatus may, e.g., be configured to generate and to transmit the data signal or the positioning reference signal.

In an embodiment, the apparatus may, e.g., be configured to receive the data signal or the positioning reference signal.

According to an embodiment, for a group of the plurality of groups and for each of at least one of the plurality of subcarriers, all resource elements of the two or more consecutive OFDM symbols of said group that are assigned to said subcarrier may, e.g., be identical.

In an embodiment, the apparatus may, e.g., be a first transmitting device that may, e.g., be configured to set the subcarriers, which are unused, to zero, to allow that said subcarriers can be used by a second transmitting device.

According to an embodiment, the apparatus may, e.g., be a second transmitting device that may, e.g., be configured to use those of the subcarriers for transmitting, which have been set to zero by a first transmitting device.

In an embodiment, for a group of the plurality of groups, all of the two or more consecutive OFDM symbols may, e.g., be identical.

According to an embodiment, the common cyclic prefix of said group may, e.g., be identical to a last part of a first symbol of said group.

In an embodiment, a length of said common cyclic prefix may, e.g., be equal to a length of an OFDM symbol of the plurality of OFDM symbols.

According to an embodiment, a length of said common cyclic prefix depends on a length of a channel impulse response.

In an embodiment, a length of said common cyclic prefix depends on a length of a 5G frame structure.

According to an embodiment, the signal that the apparatus is configured to transmit and/or to receive in the frame may, e.g., be an uplink positioning reference signal (e.g., a sounding reference signal, UL-SRS).

In an embodiment, the signal that the apparatus is configured to transmit and/or to receive in the frame may, e.g., be a downlink positioning reference signal (DL-PRS).

According to an embodiment, the apparatus may, e.g., be configured to receive at least two groups of the plurality of groups from two or more different transmitting devices in parallel.

In an embodiment, a first signal in a first one of the at least groups may, e.g., be orthogonal to a second signal in a second of the at least two groups.

According to an embodiment, the apparatus may, e.g., be configured to transmit a first group of the plurality of groups to a receiving device in parallel with another transmitting device which transmits a second group of the plurality of groups to the receiving device.

In an embodiment, a first signal in the first group may, e.g., be orthogonal to a second signal in the second group.

In an embodiment, the two or more of said at least two groups may, e.g., have a different comb offset, or different bandwidth parts, or different OFDM symbols, or combinations thereof.

According to an embodiment, the apparatus may, e.g., be configured to transmit and/or to receive the signal in the frame via a link with low delay spread.

In an embodiment, the apparatus may, e.g., be configured to transmit the signal in the frame to a satellite. Or, the apparatus may, e.g., be configured to receive the signal in the frame from a satellite.

According to an embodiment, the frame comprises a plurality of slots, wherein each group of the plurality of groups may, e.g., be assigned to exactly one slot of the plurality of slots, such that said group may, e.g., be comprised by said exactly one slot, and such that said group may, e.g., be comprised by no other slot of the plurality of slots.

In an embodiment, a first slot of the plurality of slots of the frame exhibit a different frame structure than a second slot of the plurality of slots of the frame.

Moreover, an apparatus of a wireless communication system according to an embodiment is provided.

The apparatus is configured to determine a slot configuration comprising a plurality of OFDM symbols.

Moreover, the apparatus is configured to determine one or more cyclic prefix parameters associated with a group of consecutive OFDM symbols for the slot configuration; wherein at least one OFDM symbol in the slot is not directly preceded by a cyclic prefix.

The apparatus is configured to select the slot structure for communicating data, and/or control information and/or positioning information depending on the slot configuration.

According to an embodiment, the apparatus may, e.g., be a user equipment.

In an embodiment, the apparatus may, e.g., be a satellite of the wireless communication system.

According to an embodiment, the apparatus may, e.g., be a base station of the wireless communication system.

Furthermore, a signal or a data frame for being transmitted in a wireless communication system according to an embodiment is provided. The signal is a data signal or is a positioning reference signal. The signal or the data frame comprises a plurality of OFDM symbols, wherein each of the plurality of OFDM symbols comprises a plurality of resource elements, wherein each of the plurality of resource elements of each of the plurality of OFDM symbols is assigned to one of a plurality of subcarriers.

The plurality of OFDM symbols are arranged in the signal or the data frame such that the signal or the data frame comprises a plurality of groups, wherein each of the plurality of groups comprises two or more consecutive OFDM symbols of the plurality of OFDM symbols of the signal or the data frame.

No cyclic prefix is arranged between the two or more consecutive OFDM symbols of each of the plurality of groups.

According to an embodiment, each group of at least one of the groups comprises a common cyclic prefix at the beginning of said group.

In an embodiment, no cyclic prefix exists between at least two of the groups.

According to an embodiment, for a group of the plurality of groups and for each of at least one of the plurality of subcarriers, all resource elements of the two or more consecutive OFDM symbols of said group that are assigned to said subcarrier may, e.g., be identical.

In an embodiment, for a group of the plurality of groups, all of the two or more consecutive OFDM symbols may, e.g., be identical.

According to an embodiment, the common cyclic prefix of said group may, e.g., be identical to a first symbol of said group.

In an embodiment, the common cyclic prefix of said group may, e.g., be a cyclic prefix for at least one OFDM symbol of the two or more consecutive OFDM symbols of said group.

According to an embodiment, the common cyclic prefix may, e.g., depend on two or more of the plurality of resource elements of at least one of the two or more consecutive OFDM symbols of said group.

In an embodiment, a length of said common cyclic prefix may, e.g., be equal to a length of an OFDM symbol of the plurality of OFDM symbols.

According to an embodiment, a length of said common cyclic prefix depends on a length of a channel impulse response.

In an embodiment, a length of said common cyclic prefix depends on a length of a 5G frame structure.

According to an embodiment, the signal may, e.g., be a positioning reference signal.

In an embodiment, the positioning reference signal may, e.g., be a sounding positioning reference signal being transmitted from the user equipment, or may, e.g., be a positioning reference signal being received by the user equipment or being transmitted from the user equipment.

According to an embodiment, the positioning reference signal may, e.g., be transmitted or received by the user equipment using at least two groups of the plurality of groups of the signal or the data frame.

In an embodiment, the two or more of said at least two groups may, e.g., have a different comb offset, or different bandwidth parts, or different OFDM symbols, or combinations thereof.

According to an embodiment, the signal or the data frame comprises a plurality of slots, wherein each group of the plurality of groups may, e.g., be assigned to exactly one slot of the plurality of slots, such that said group may, e.g., be comprised by said exactly one slot, and such that said group may, e.g., be comprised by no other slot of the plurality of slots.

In an embodiment, a first slot of the plurality of slots of the signal or the data frame exhibit a different frame structure than a second slot of the plurality of slots of the signal or the data frame.

Moreover, a wireless communication system according to an embodiment is provided. The wireless communication system comprises a first apparatus according to one of the above-described embodiments, being a user equipment, and a second apparatus according to one of the above-described embodiments, being a satellite. The first apparatus is configured to transmit the signal in the frame to the second apparatus. Or, the second apparatus is configured to transmit the signal in the frame to the first apparatus.

Furthermore, a first user equipment for transmitting and receiving data in a wireless communication system according to an embodiment is provided.

The first user equipment is configured to transmit and/or to receive a positioning reference signal over the one or more second resources.

Moreover, the first user equipment is one of a plurality of user equipments of the wireless communication system and the plurality of user equipments may share the same frame by frequency division multiplex and/or time division multiplex and/or code division multiplex and/or using different cyclic shifts.

Each of the plurality of user equipments is assigned to a group of two or more groups, wherein each of the plurality of groups comprises two or more of the plurality of user equipments.

The first user equipment is configured to receive a configuration message indicating, for each resource element of a plurality of resource elements, which resource elements are assigned to each group of the two or more groups.

Moreover, the first user equipment is configured to transmit and/or to receive the positioning reference signal by only using one of those of the plurality of resource elements, for which the configuration information indicates that the group to which the user equipment belongs is allowed to access.

According to an embodiment, the plurality of resource elements are resource elements for wideband positioning.

In an embodiment, the two or more user equipments of a group of the two or more groups, which share a same resource element of the plurality of resource elements, are separated by a cyclic shift.

According to an embodiment, the two or more user equipments of a group of the two or more groups, which share a same resource element of the plurality of resource elements, are separated by different sequences.

In an embodiment, each of the plurality of resource elements belongs to a subcarrier of a plurality of subcarriers and to an OFDM symbol of a plurality of OFDM symbols. The configuration message specifies, for each resource element of the plurality of resource elements, which group of the two or more groups may, e.g., be allowed to access said resource element, according to a configuration scheme, by assigning, for each OFDM symbol of the plurality of OFDM symbols, each subcarrier of the plurality of subcarriers to a group of the two or more groups.

According to an embodiment, for each OFDM symbol of the plurality of OFDM symbols, for each group of the two or more groups, at least one of the plurality of subcarriers may, e.g., be assigned to said group by the configuration scheme.

In an embodiment, an assignment of the subcarriers to the two or more groups may, e.g., be changed by the configuration scheme.

According to an embodiment, the assignment of the subcarriers to the two or more groups may, e.g., be changed by the configuration scheme periodically with respect to a number of OFDM symbols.

In an embodiment, for each OFDM symbol of the plurality of OFDM symbols, all subcarriers are assigned by the configuration scheme to a same group of the two or more groups.

Moreover, a network entity for a wireless communication system according to an embodiment is provided.

The network entity is configured to transmit a configuration message over one or more first resources to a plurality of user equipments of the wireless communication system, wherein the configuration message comprises configuration information indicating one or more second resources, wherein the configuration information is suitable to be employed by the plurality of user equipments for transmitting or for receiving a positioning reference signal over the one or more second resources.

Each of the plurality of user equipments is assigned to a group of two or more groups, wherein each of the plurality of groups comprises two or more of the plurality of user equipments.

The configuration message specifies, for each resource element of a plurality of resource elements, which group of the two or more groups is allowed to access said resource element.

According to an embodiment, the network entity may, e.g., be a base station.

In an embodiment, the plurality of resource elements are resource elements for wideband positioning.

According to an embodiment, the two or more user equipments of a group of the two or more groups, which share a same resource element of the plurality of resource elements, are separated by a cyclic shift.

In an embodiment, the two or more user equipments of a group of the two or more groups, which share a same resource element of the plurality of resource elements, are separated by different sequences.

According to an embodiment, each of the plurality of resource elements belongs to a subcarrier of a plurality of subcarriers and to an OFDM symbol of a plurality of OFDM symbols. The configuration message specifies, for each resource element of the plurality of resource elements, which group of the two or more groups may, e.g., be allowed to access said resource element, according to a configuration scheme, by assigning, for each OFDM symbol of the plurality of OFDM symbols, each subcarrier of the plurality of subcarriers to a group of the two or more groups.

According to an embodiment, for each OFDM symbol of the plurality of OFDM symbols, for each group of the two or more groups, at least one of the plurality of subcarriers may, e.g., be assigned to said group by the configuration scheme.

In an embodiment, an assignment of the subcarriers to the two or more groups may, e.g., be changed by the configuration scheme.

According to an embodiment, the assignment of the subcarriers to the two or more groups may, e.g., be changed by the configuration scheme periodically with respect to a number of OFDM symbols.

In an embodiment, for each OFDM symbol of the plurality of OFDM symbols, all subcarriers are assigned by the configuration scheme to a same group of the two or more groups.

Moreover, a wireless communication system according to an embodiment is provided. The wireless communication system comprises a first user equipment according to one of the above-described embodiments and a network entity according to one of the above-described embodiments. The network entity is configured to transmit the configuration message to the first user equipment.

Some of the embodiments provide a modified OFDM frame structure.

Some of the embodiments may, e.g., be employed for wideband positioning applications.

The concept of the modified frame structure is also applicable to communication and offers support for very low SINR scenarios, an/or scenarios wherein the OFDM transmissions from different TRP arrive with high offset.

In the following, some explanations to obtain a better understanding for embodiments of the present invention are provided.

As examples, scenarios may, e.g., be considered where non-terrestrial networks (NTN) share the spectrum resources with terrestrial networks, and/or where an extension of coverage radius is desired (while keeping the power spectral density within a desired range), and/or where a high TRP distance exists.

At first, a scenario is considered, where an NTN network exists as overlay to terrestrial network.

Figure 2:
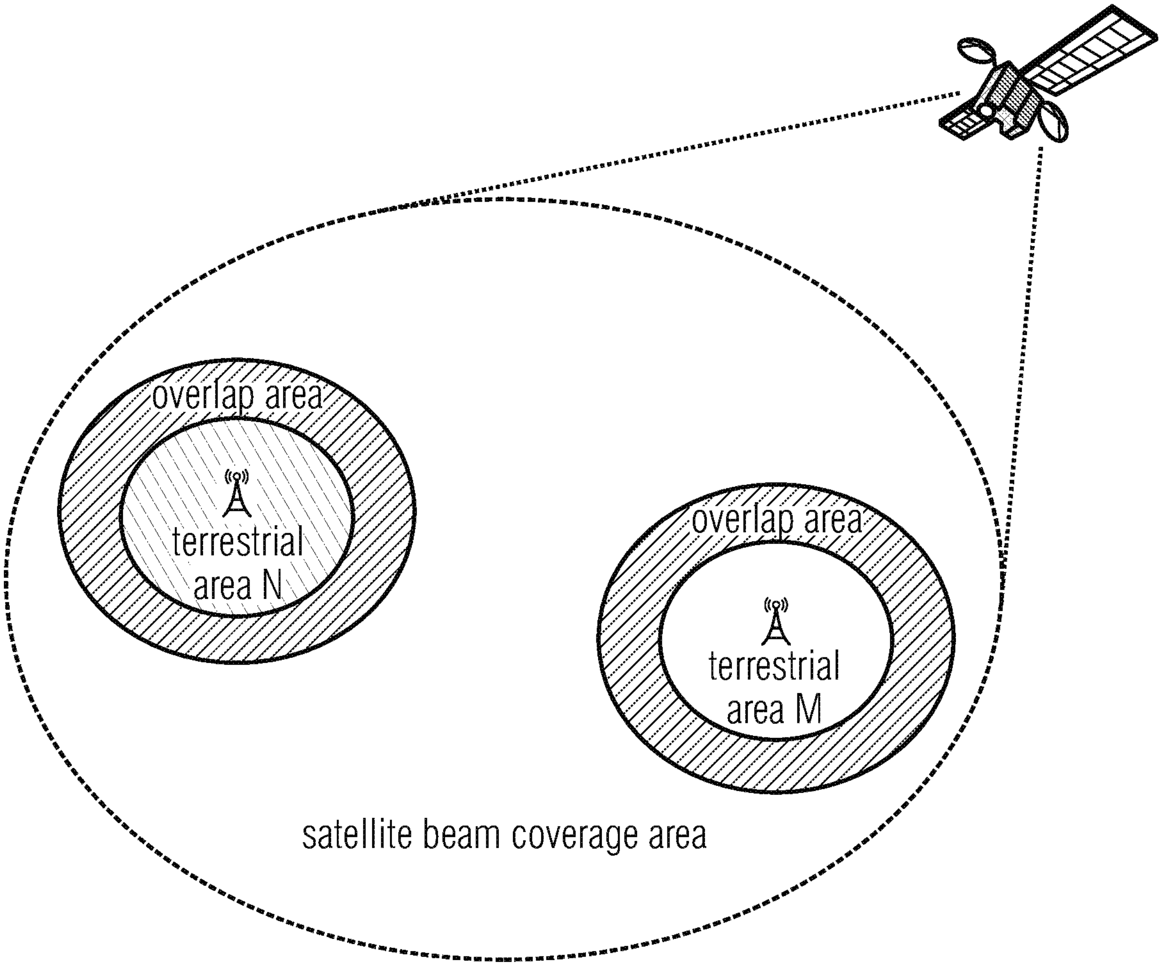
FIG. 2 illustrates a satellite overlay system.

A full coverage of wide areas using 5G technologies may be expensive or very difficult (e.g. maritime applications). FIG. 2 shows an example of a satellite overlay system. In areas with many user (e.g. urban areas) a terrestrial network is deployed. The area in between can be served by a satellite. The area served by a satellite beam is typically much larger than the area served by a terrestrial TRP (transmit and receive point) and it is not feasible to exclude the area served by terrestrial TRP from the satellite coverage. Therefore, the satellite system and the terrestrial system typically use different spectrum resources.

An alternative would be to use a satellite signal, wherein the signal strength of the satellite signal is low (e.g. even lower than the thermal noise) resulting in a low SNR. In this case the interference satellite to terrestrial network is low. The satellite may slightly reduce the SINR for the terrestrial signal. The satellite signal may, e.g., be configured to allow decoding at low SINR. In the overlap area "terrestrial/satellite coverage" complementary interference mitigation technologies or diversity combining strategies may, e.g., be employed.

In the following, networks with common synchronization are considered.

The 5G air-interface supports a flexible resource management. The signal is split in the time-frequency domain in resource elements ("REs"). The radio resource control (RRC) assigns the REs to a UE. For downlink the modulation and FEC parameter selected for the RE are selected according the signal quality of the link to the target UE. For uplink different UEs may use different REs. This flexible resource management requires a full synchronization within a margin according to the selected OFDM parameter. The required accuracy for the carrier frequency depends on the sub-carrier spacing. For the required carrier frequency accuracy frequency offsets resulting from the Doppler shift according to the movement of satellites (e.g. low earth orbit (LEO) satellites) should be taken into account. The required accuracy for the OFDM symbol timing depends on the OFDM symbol length. In case of satellite applications pre-compensation of the effects resulting from the satellite movement may be applied. However, this pre-compensation may be valid for one reception point only.

Unfortunately, there is a trade-off between the tolerance for frequency offset and required timing accuracy. Increasing the sub-carrier spacing reduces the OFDM symbol length and vice versa.

Usually, the network is synchronized in a way that all TRPs are synchronized to a common reference in time (framing) and frequency. "Synchronized" does not mean that a perfect synchronization is required. Some offsets within a given margin may be acceptable or may be even subject of a network optimization. Typically, the UEs synchronize to the downlink signal. According the time-of-flight resulting from the distance TRP⇔UE the recovered framing of the UE may be slightly delayed. For the uplink the UE shall transmit the signal that the signal arrives at the TRP synchronized to the framing of the TRP. To achieve this the UE transmit the signal with a "timing advance" (TA) representing an offset to the recovered framing.

If several TRPs are used, the network synchronization may be challenging, especially if the OFDM symbols are short (=high subcarrier spacing). For NTN networks LEO or MEO satellites may be used. These satellites move relative to the reception point and according the relative speed a Doppler shift and distance change result. These effects can be partly compensated in the satellite. An ideal pre-compensation (or post-compensation for the up-link) is valid for one point on the earth and for this point ("nominal UE position") it is possible to synchronize the satellite TRP to a terrestrial TRP. For other UE positions the synchronization may be sub-optimal. The effect is depicted in FIG. 3.

Figure 3:
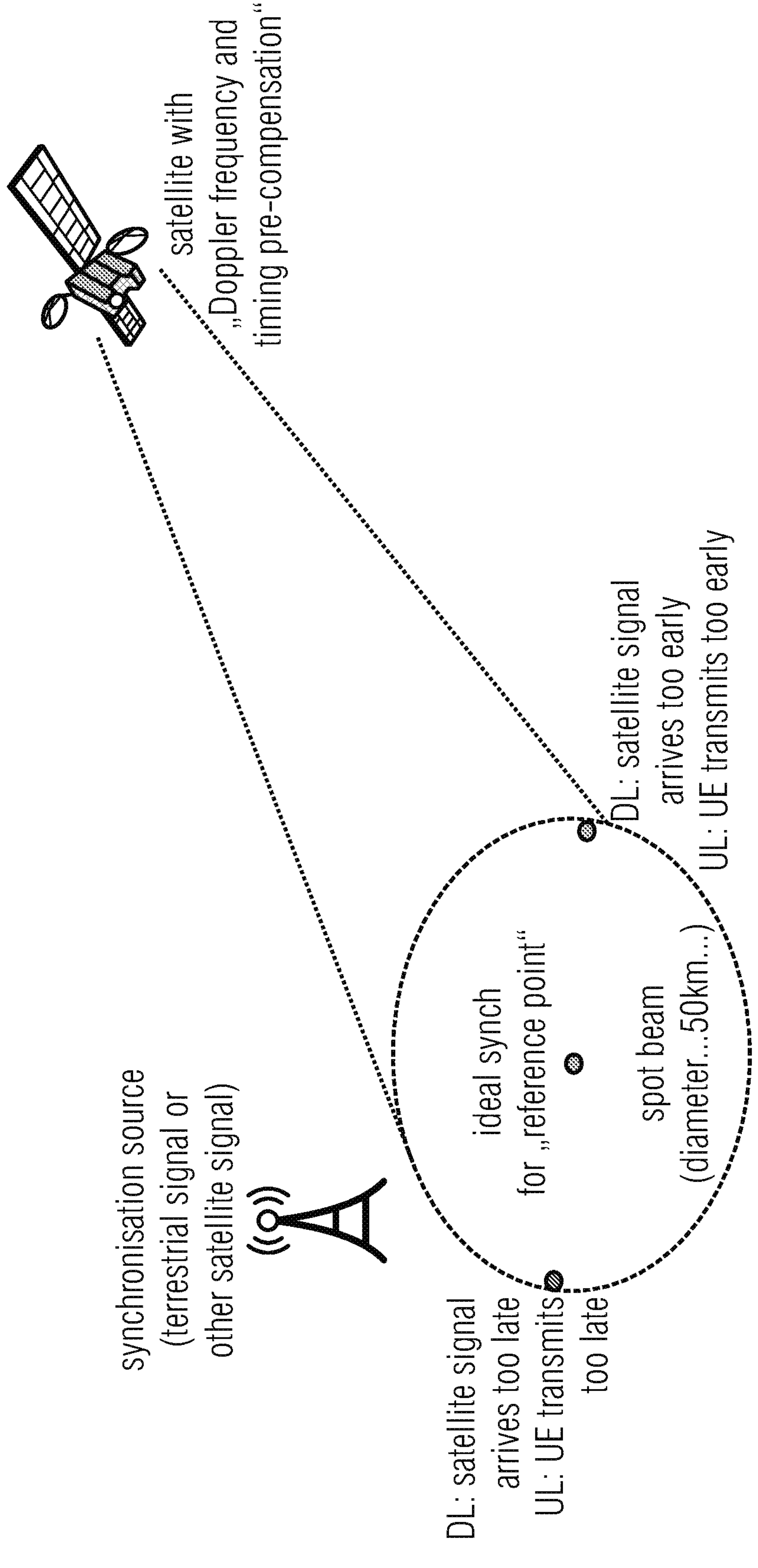
FIG. 3 illustrates a timing offset for spot beam satellite with UE synchronized to second source.

FIG. 3 illustrates a timing offset for spot beam satellite with UE synchronized to second source.

If the satellite works stand-alone and only one satellite is used this would not be an issue. The UE synchronizes to the downlink (time offsets in the downlink are not relevant). For the uplink the timing advance of the UE can be adjusted to ensure that the signals from different UEs arrive at the same time at the satellite.

However, if several satellites are used or the satellite and terrestrial signal share the same spectrum resources the synchronization becomes challenging. The required synchronization accuracy depends on the selected OFDM parameters. If the synchronization fulfills the required accuracy combining of satellite signals (e.g. "soft handover") or combining of terrestrial and satellite signals in the overlap area becomes feasible.

In the following, positioning applications are considered.

For positioning applications, several TRPs (gNBs) are used for triangulation. According to the distance difference between a UE and a TRPn the signals arrive with a time offset. To maintain the orthogonality of the signals the following criteria has to apply:

The sum $$t_{offset} = t_{synch} + t_{distance} + t_{multipath} + t_{TAerror}$$

with $t_{synch}$ is the offset due to non-ideal symbol timing recovery;

$t_{distance}$ is the offset due to the distance difference;

$t_{multipath}$ is the delay of the multipath components;

$t_{TAerror}$ is the offset due to non-ideal timing advance setting (for uplink only);

has to be less than the cyclic prefix length. For positioning application this sum can be minimized for one link only. For all other links higher offsets will result.

Usually the spectrum is exclusively assigned to satellite or terrestrial system. In some cases a careful coordination of the use of the resource over satellite or over terrestrial network is applied to avoid interference.

However, in the future the demand on sharing spectrum may become higher.

5G now supports also frequency bands for terrestrial networks up to now mainly used by satellites (e.g. Ka-band). If mechanisms coordinating the use of the spectrum between satellite and terrestrial may simplify the frequency sharing and an exclusive assignment of the spectrum to satellite or terrestrial is no longer required.

In some embodiments, concepts are provided, wherein the same spectrum resources is used for satellite and terrestrial.

For positioning applications some loss of orthogonality may result, limiting the overall system performance or the sharing of resources. Furthermore, a precise synchronization has to be established before a position signal can be transmitted. This may increase the power consumption.

In the following, concepts of the present are described in more detail.

At first, it is noted that the term slot can also be refer in the context of 5G to a subframe comprising multiple slots or a frame comprising multiple sub-frame. A radio frame may be fixed in time such as 10 ms duration and comprises 10 subframes and the duration may be fixed such as 1 ms duration.

| Radio Frame | SFN_0 | | | | | | | | | | . . . | SFN_N | | | | | | | | | |
|---|---|---|---|---|---|---|---|---|---|---|---|---|---|---|---|---|---|---|---|---|---|
| Subframe | 0 | 1 | 2 | 3 | 4 | 5 | 6 | 7 | 8 | 9 | . . . | 0 | 1 | 2 | 3 | 4 | 5 | 6 | 7 | 8 | 9 |

In 5G, each subframe may comprise a number of slots. The slot configuration may be different for different subcarrier spacing as shown below. Where each slot comprises 14 OFDM symbols.

| | | | | | | | | | | | | | | | | |
|---|---|---|---|---|---|---|---|---|---|---|---|---|---|---|---|---|
| 15 KHz | Slot 0 | | | | | | | | | | | | | | | |
| 30 KHz | Slot 0 | | | | | | | | Slot 1 | | | | | | | |
| 60 KHz | Slot 0 | | | | Slot 1 | | | | Slot 2 | | | | Slot 3 | | | |
| 120 KHz | 0 | | 1 | | 2 | | 3 | | 4 | | 5 | | 6 | | 7 | |
| 240 KHz | 0 | 1 | 2 | 3 | 4 | 5 | 6 | 7 | 8 | 9 | 10 | 11 | 12 | 13 | 14 | 15 |

In one example, the BS can indicate the TDD subframe or slot format in a SIB as shown in the Table below.

Table 1 shows an example of Slot formats (U: UL, D: DL and F: flexible) in TS 38.213

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |

The proposed solution is based on a modified OFDM frame structure offering a higher flexibility for the tradeoff subcarrier spacing versus allowed OFDM. The proposed frame structure is aligned to the existing 5G frame structure minimizing the impact to the standard.

In the following, an OFDM frame structure for low SNIR operation according to particular embodiments is described.

It is noted that the selection of the OFDM parameter is a trade-off between symbol timing accuracy requirements (cylic prefix length) and sensitivity to carrier frequency offset or Doppler-frequencies (sub carrier spacing).

For low SNIR operation the utilized spectrum efficiency is low. If overhead resulting from pilot symbols etc. are not taken into account the spectrum efficiency is the product of modulation order (bits per modulation symbol) and code rate.

If the code rate is low it may be possible to split the code rate into two parts, namely a spreading factor or repetition factor and a code rate of the used FEC scheme.

The 5G standard supports already different signal constellations and code rate combinations to adapt the modulation and FEC coding parameter to the signal quality. Additional flexibility can be achieved if the modulation and FEC coding is combined with spreading (in the simplest case repeating the channel symbols). Examples for possible combination of signal constellation repetition factor and code rate together with the resulting spectrum efficiency and the theoretical required SNR (according Shannon formula) are given in the following table:

| BW efficiency bit/sec/Hz | SNR [dB] (Shannon) | Signal constellation | Spreading/ Repetition | Coderate |
|---|---|---|---|---|
| 0.125 | −10.4 | BPSK | 4 | 1/2 |
| 0.125 | −10.4 | BPSK | 2 | 1/4 |
| 0.125 | −10.4 | QPSK | 4 | 1/4 |
| 0.25 | −7.2 | BPSK | 2 | 1/2 |
| 0.25 | −7.2 | BPSK | 2 | 1/2 |
| 0.25 | −7.2 | QPSK | 4 | 1/2 |
| 0.5 | −3.8 | QPSK | 3 | 3/4 |
| 0.75 | −1.7 | QPSK | 2 | 3/4 |
| 0.75 | −1.7 | QPSK | 2 | 3/4 |
| 1 | 0.0 | QPSK | 1 | 1/2 |
| 1 | 0.0 | 16-QAM | 2 | 1/2 |
| 1 | 0.0 | 16-QAM | 3 | 3/4 |
| 1.25 | 1.4 | 64-QAM | 3 | 5/8 |
| 1.5 | 2.6 | 64-QAM | 3 | 3/4 |
| 1.5 | 2.6 | 64-QAM | 2 | 1/2 |
| 1.8 | 3.9 | 64-QAM | 2 | 3/5 |
| 2 | 4.8 | 64-QAM | 2 | 2/3 |
| 2.25 | 5.7 | 64-QAM | 2 | 3/4 |

Regarding spreading (or repetition), two options exist, namely, along the frequency axis (several sub-carrier are used) and/or along the time axis (several OFDM symbols are used).

In some embodiments, spreading/repetition is conducted along the time axis. If adjacent OFDM symbols carry the same information for (at least the relevant) the sub-carriers carry the same information, a cyclic prefix is only required for the first OFDM symbol. It may be even possible to use an additional OFDM symbol as cyclic prefix.

As an example, a bundle of L=5 OFDM symbols is used (in other words: a group of consecutive OFDM symbols, here, a group of five consecutive OFDM symbols).

In the example, we consider a signal design compatible to the 5G frame structure. A slot with a duration of 0.5 ms (e.g. 30 kHz subcarrier spacing) and a bandwidth of up to 100 MHz includes 61440 samples, assuming a sampling frequency of 122.88 MHz (FFT length 4096).

This slot includes 14 OFDM symbols with cyclic prefix (CP), namely 13 OFDM symbols each with a CP length of 288 samples, and 1 OFDM symbol with a CP length of 352 samples. This results in a total of 14 (OFDM symbols)*4096 (FFT length)+13*288+352=61440 samples within the slot.

In an embodiment, instead of using 14 symbols with CP the slot can be filled with N OFDM symbols without CP.

In an example, N=15 symbols with same subcarrier spacing (SCS) and same FFT length 15*4096=61440 result.

In another example, N=30 symbols with half FFT length (twice SCS): 30*2048=61440 result.

In a further example, N=60 symbols with quarter FFT length: 60*1024=61440 result.

In still another example, N=120 symbols with FFT length 512: 120*512=61440 result.

Alternatively, in further embodiments, the higher SCS can be used to extend the bandwidth with a given FFT length.

In some of the embodiments, the N symbols may, e.g., be grouped into K groups, wherein each bundle comprises N/K=L OFDM symbols without CP and each OFDM symbol includes the same signal (symbol is repeated).

As an example, N=15, K=3 and L=5 is considered.

Figure 4:
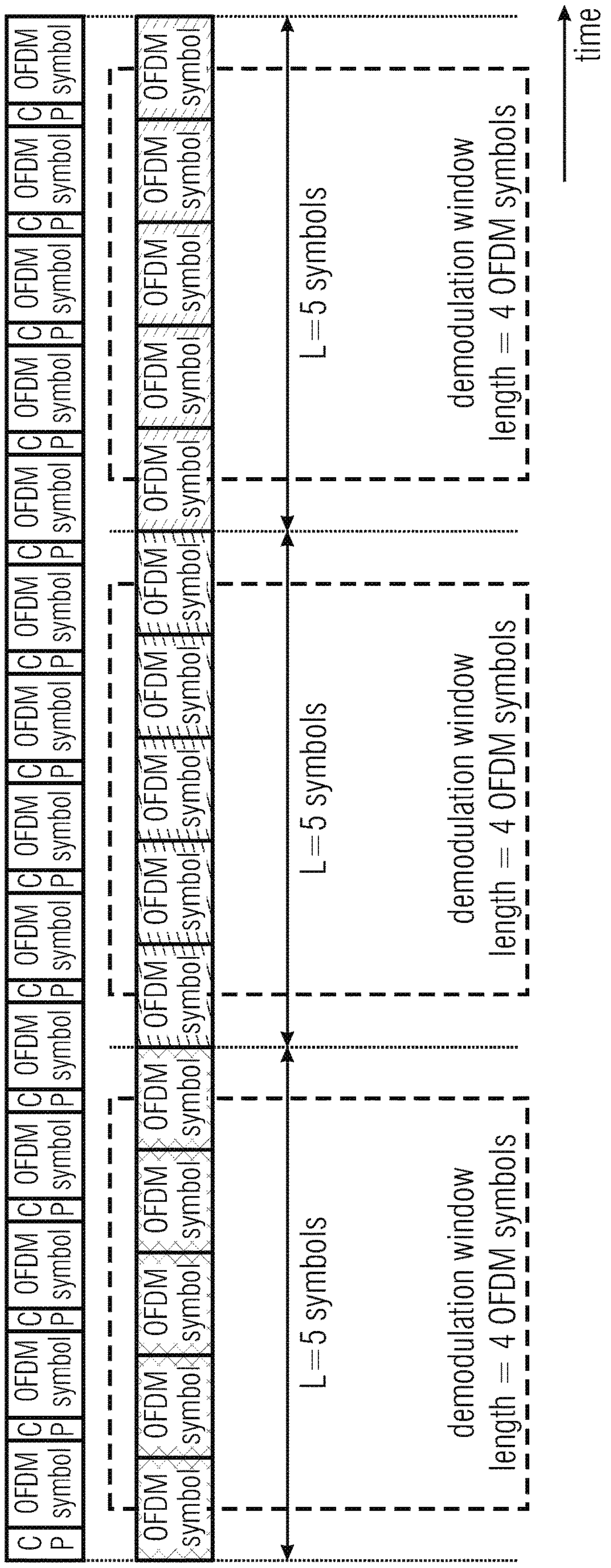
FIG. 4 illustrates a bundling of OFDM symbols without cyclic prefix.

FIG. 4 illustrates such a bundling of OFDM symbols without cyclic prefix.

For communication purpose the CP reduces the inter-symbol interference in case of multipath propagation. Typically, the CP length is selected according to the expected delay spread. For the selection of the OFDM parameters typically the following trade-offs has to be taken into account:

A lower SCS results in a longer symbol duration what results in a lower overhead for the CP assuming a given delay spread. However, a low SCS makes the system very sensitive to frequency offsets.

A higher SCS results in a less sensitive to frequency offset and Doppler spread what results in a shorter symbol duration what further results in a higher overhead for CP for a given channel impulse length.

An example for a configuration according an embodiment is provided in the following table. The table compares the parameter of 5G, a version with extended CP length (the traditional way to make a system more robust for timing Offset or high delay spreads) and 3 examples for a OFDM frame structure according to the embodiments. The parameters are compliant to a 5G framing using 0.5 ms slot duration. The modified frame structure may be used for positioning applications and is called wideband positioning slot (WPS) in the example. It is noted that the OFDM framing with extended CP length may, e.g., not be compatible to the 5G framing.

| Parameter | Normal slot (5G standard) | OFDM with 25% CP | WPS Example 1 | WPS Example 2 | WPS Example 3 | Comments |
|---|---|---|---|---|---|---|
| SCS | 30 kHz | 30 kHz | 30 kHz | 60 kHz | 120 kHz | The SCS defines also the required frequency estimation accuracy (e.g. 5 . . . 10% of the SCS) |
| Maximum speed (Example) | 112 m/s | 112 m/s | 112 m/s | 225 m/s | 450 m/s | Without Doppler shift compensation, Example is applicable to fc = 4 GHZ, maximum Dopplershift 5% of SCS (1.5 kHz for SCS 30 kHz) |

-continued

| Parameter | Normal slot (5G standard) | OFDM with 25% CP | WPS Example 1 | WPS Example 2 | WPS Example 3 | Comments |
|---|---|---|---|---|---|---|
| Maximum bandwidth for FFT-length 4096 | 100 MHz | 100 MHz | 100 MHz | 200 MHz | 400 MHz | App. 80% of the sub-carrier are used. The remaining 20% are used for the "guard band" |
| Slot duration | 0.5 ms | 0.583 ms | 0.5 ms | 0.5 ms | 0.5 ms | |
| OFDM symbols per slot | 14 | 14 | 15 | 30 | 60 | |
| CP length per OFDM symbol | 2.34 microsec. | 8.33 microsec | 0 | 0 | 0 | |
| Maximum OFDM symbol timing offset | 2.34 microsec | 8.33 microsec | 33.3 microsec | 16.7 microsec | 8.33 microsec | For the WPS the effective CP length is one OFDM symbol |
| Overhead (L = 5) | 6.67% | 25% | 25% | 25% | 25% | Overhead if only L-1 symbols are used for demodulation |

Table 2 shows a comparison of traditional OFDM frames with CP per OFDM symbol (column 1 and 2) with OFDM symbol bundle using one OFDM symbol as CCP (column 3, 4 and 5)

In the following, an extension of the concept "OSB" (OFDM symbol bundle; in other words: a group of consecutive OFDM symbols) is provided.

The frame structure described above can be considered as a full OFDM symbol is used as cyclic prefix for a bundle of (L−1) OFDM symbols. In the examples above for L=5, four OFDM symbols use a complete OFDM symbol as cyclic prefix resulting in an overhead of 25%. For a repetition factor of 4 or higher this may be acceptable. If the repetition factor is lower the overhead may become too high.

Instead of adding a full OFDM symbol to a bundle of (L−1) OFDM symbols, in some embodiments, parts of an OFDM symbol may, e.g., be used as "common cyclic prefix" (CCP). In an embodiment, the CCP may be a copy of the last part of the first symbol of a bundle. See, for example, the example of FIG. 5.

Figure 5:
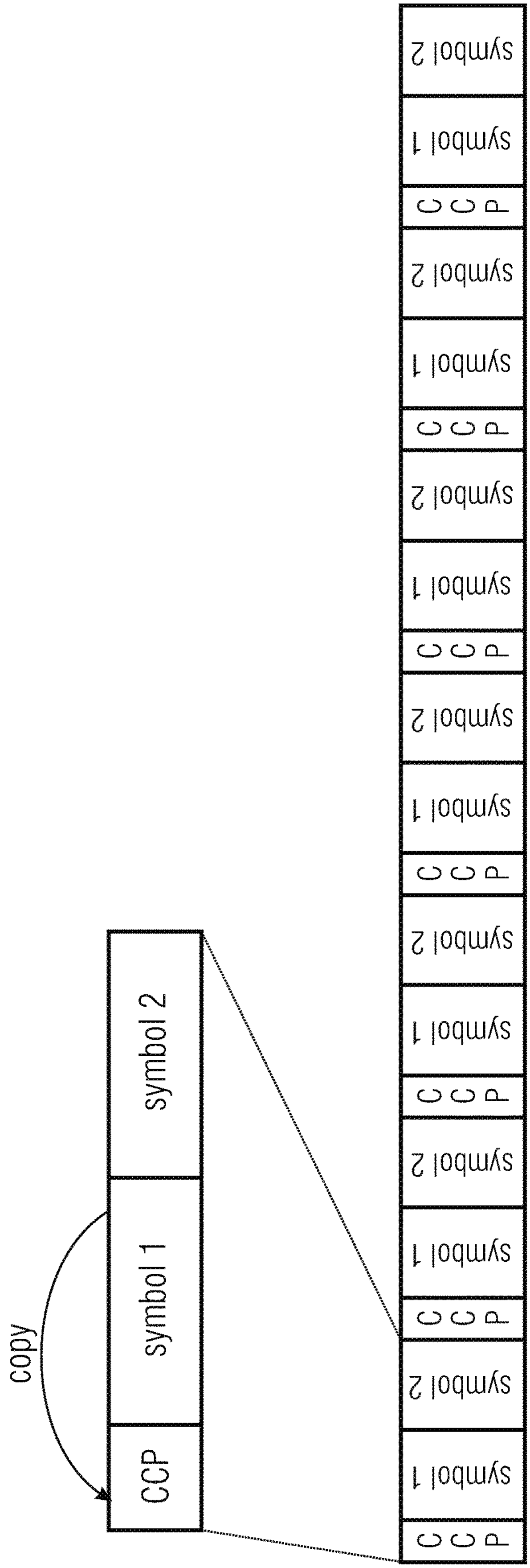
FIG. 5 illustrates an OFDM symbol bundle.

In particular, FIG. 5 illustrates an OFDM symbol bundle (OSB) (in other words: a group of consecutive OFDM symbols).

As an example, again a slot of 0.5 ms and SCS=30 kHz may, e.g., be considered. Two OFDM symbols are bundled and for each bundle a CCP is added. The related parameters and further examples for other bundling factors and 5G 0.5 ms slot compliant structures are given in the following table.

| Bundle length | 1 (no bundling = 5G standard) | 2 | 3 (one OFDM symbol used as CCP) | 2 and 3 | 5 (one OFDM symbolused as CCP) | 3 and 4 |
|---|---|---|---|---|---|---|
| OFDM symbols per slot | 14 | 14 | 15 | 14 (4 bundles with 3 symbols, one bundle uses only 2 symbols) | 15 | 14 (3 bundles with 4 symbols, one bundle uses only 2 symbols) |
| Bundles per slot of 14 or 15 symbols | NA | 7 | 5 | 5 | 3 | 4 |
| FFT length (Example) | 4096 | 4096 | 4096 | 4096 | 4096 | 4096 |
| CCP length, first bundle samples @ fs = 122.88 MHz | 352 | 640 | 4096 (0, see note) | 896 | 4096 (0, see note) | 1096 |
| CCP length, remaining bundles samples @ fs = 122.88 MHz | 288 | 576 (=2*288) | 4096 (0, see note) | 800 | 4096 (0, see note) | 1000 |

-continued

| Bundle length | 1 (no bundling = 5G standard) | 2 | 3 (one OFDM symbol used as CCP) | 2 and 3 | 5 (one OFDM symbolused as CCP) | 3 and 4 |
|---|---|---|---|---|---|---|
| Relative to "normal structure" | Ref ("normal structure") | 2 | See note | 2.7 | See note | 3.47 |
| Total slot length | 61440 | 61440 | 61440 | 61440 | 61440 | 61440 |

Table 3 shows examples for OFDM symbol bundles compatible to 0.5 ms slot length (all values assume a sampling frequency of 122.88 MHz and a maximum bandwidth of 100 MHz (equivalent to FFT length 4096).

It is noted that for the configurations using a complete OFDM symbol as CCP three operation modes are considered (details see below).

A channel with low delay spread (e.g. satellite application) results in that the interference caused by multipath propagation is small. The additional OFDM symbol is used as payload. In case of some remaining interference between consecutive OFDM symbols, alternative interference cancellation methods may be applied for interference cancellation. Other parts of the spectrum (BWPs) may target communication between UEs and TRPs with low SINR.

In this case the BWPs of related OFDM symbols may include the same content (repetition is applied) and one symbol is considered as CCP with length identical to one OFDM symbol.

The slot configuration and the number CP configuration within a slot (including OSB bundle config) may, e.g., depend on a delay spread, and/or a repetition or spreading factor, and/or a SINR, and/or FR1/FR2 (and antenna configuration).

In the following, particular methods to determine the slot configuration according to particular embodiments are described.

Regarding downlink measurements, a UE may, e.g.:

Perform measurements on one or more downlink reference signals (for example, CSI-RS, PRS, SSB, etc.))

Provide the network with a report according to the performed measurements; and

Receive a slot format configuration or slot configuration indication

Regarding uplink measurements, a BS may, e.g.:

Perform measurements on one or more uplink reference signals (e.g., SRS, RACH, etc.)

Select a slot configuration depending on the measurements and the main method.

In a deployment scenario configuration, a UE may, e.g., receive over an interface, such as PDCCH, DCI or PBCH, an indication on the applicable slot format.

The configuration of the CP parameters may, e.g., depend on an SCS, and/or a carrier frequency, and/or a timing accuracy, and/or a delay spread parameter.

In the following, multi-beam operations are or use of several antenna are considered.

In one aspect, MIMO operation involve transmission and/or reception over multiple antennas. Channel sounding procedure may, e.g., be performed on the downlink or uplink reference signals. The beam determination requires the identification of the best beams which is not necessarily the beams received with the highest power. This requires additional information than the RSRP for reporting or beam indication. In one example, the beam selection can be use information in the delay spread or the multipath characteristics which can optionally be combined with the RSRP information for the beam selection. Accordingly one procedure for the beam configuration based on a measurement or a report comprises information on the channel measurements or an indication derived from the measurements.

In the following, applications for WPS and OSB are considered.

For example, in embodiments, the WPS/OSB structure is applicable to low SINR operation modes, where the OFDM modulation may, e.g., be combined with repetition. The bundling factor is the repetition (spreading) factor.

Moreover, the WPS/OSB structure is, for example, applicable to channels with low delay spread, where the interference between adjacent OFDM symbols may, e.g., be low. In this case no CP may be inserted and all OFDM symbols or the subcarrier related to the BWP used for links with low delay spread may carry payload data.

Furthermore, the WPS/OSB structure is, for example, applicable to alternative interference cancellation methods, where the inter-symbol interference caused by my multipath propagation may, for example, be cancelled by iterative decoding. Two embodiments may be considered:

For the first OFDM symbol a CCP is added. This first OFDM symbol can be therefore decoded without interference from the preceding OFDM symbol. Assuming the CIR is estimated by performing measurements on reference symbols the interference to the subsequent OFDM symbols can be predicted (and cancelled).

No CCP is used at all and a continuous sequence of OSB frames is assumed.

Moreover, the WPS/OSB structure is, for example, applicable to positioning applications, where the timing advance may, e.g., be adjusted for one gNB only. For other gNB the positioning signal will arrive with offset. For positioning low SINR operation will be considered anyway.

Using OSB increases the tolerance for non-ideal OFDM symbol timing.

In the following, low SINR scenarios are considered.

At first satellite coverage with UEs having a small UE antenna are considered.

For satellite based systems two scenarios are considered, namely, a UE with high gain antenna, e.g., "high SINR mode", and a UE with small antenna, e.g., a low SINR mode.

As an application example we assume a terrestrial network with "satellite overlay". For this scenario, three reception points (see again FIG. 2) are considered, namely, satellite coverage (where no terrestrial signal is available), terrestrial coverage (where the satellite signal is considered as interfering signal), and an overlap area.

Figure 6:
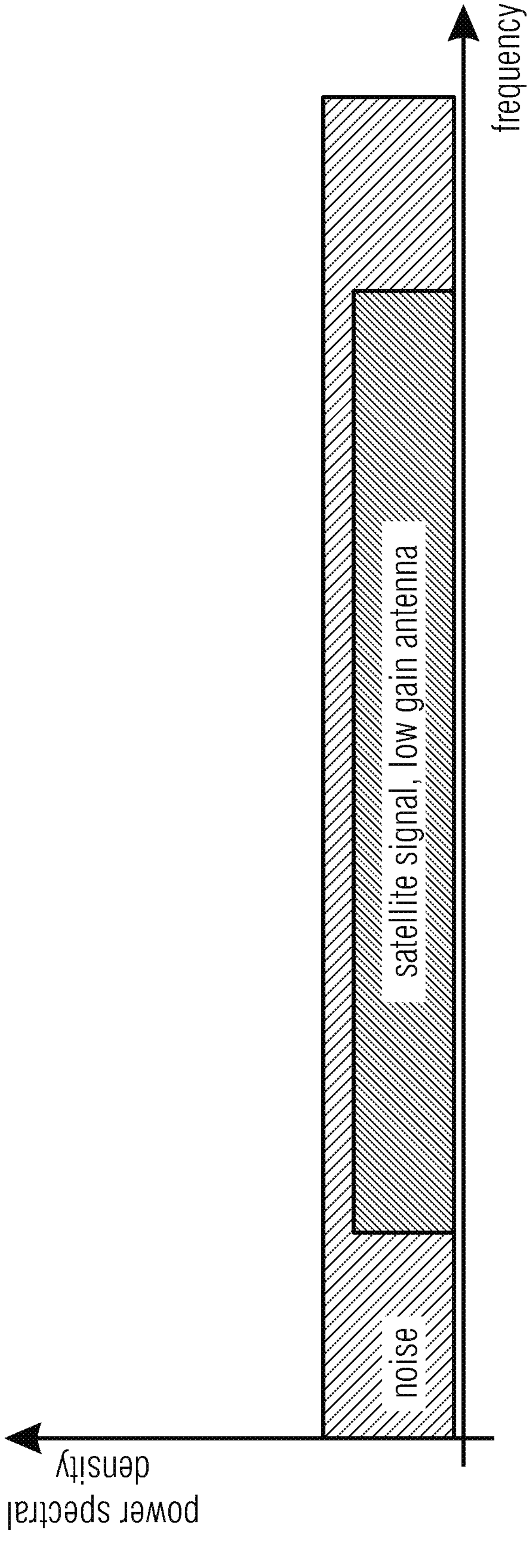
FIG. 6 illustrates the received signal charateristics in the frequency domain for satellite reception with low SNR.

FIG. 6 illustrates a satellite reception with low SNR.

Figure 7:
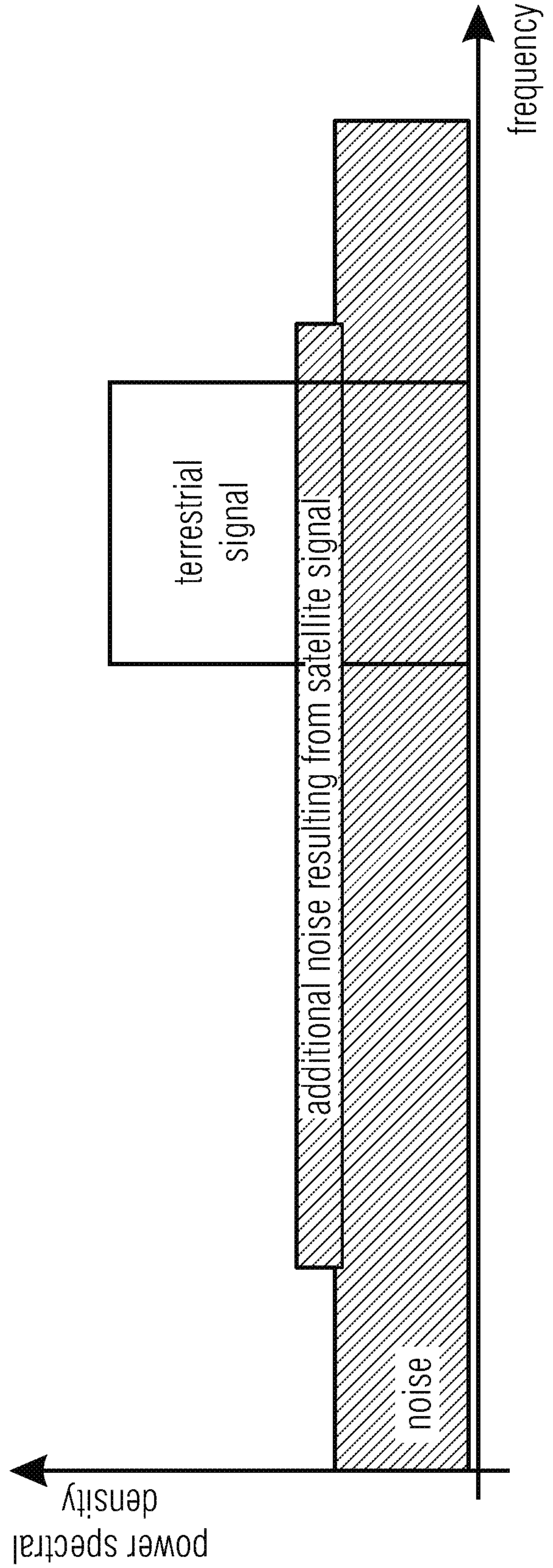
FIG. 7 illustrates the received signal charateristics in the frequency domain for a terrestrial coverage, wherein the satellite signal is considered as additional noise.

FIG. 7 illustrates a terrestrial coverage, wherein the satellite signal is considered as additional noise.

Figure 8:
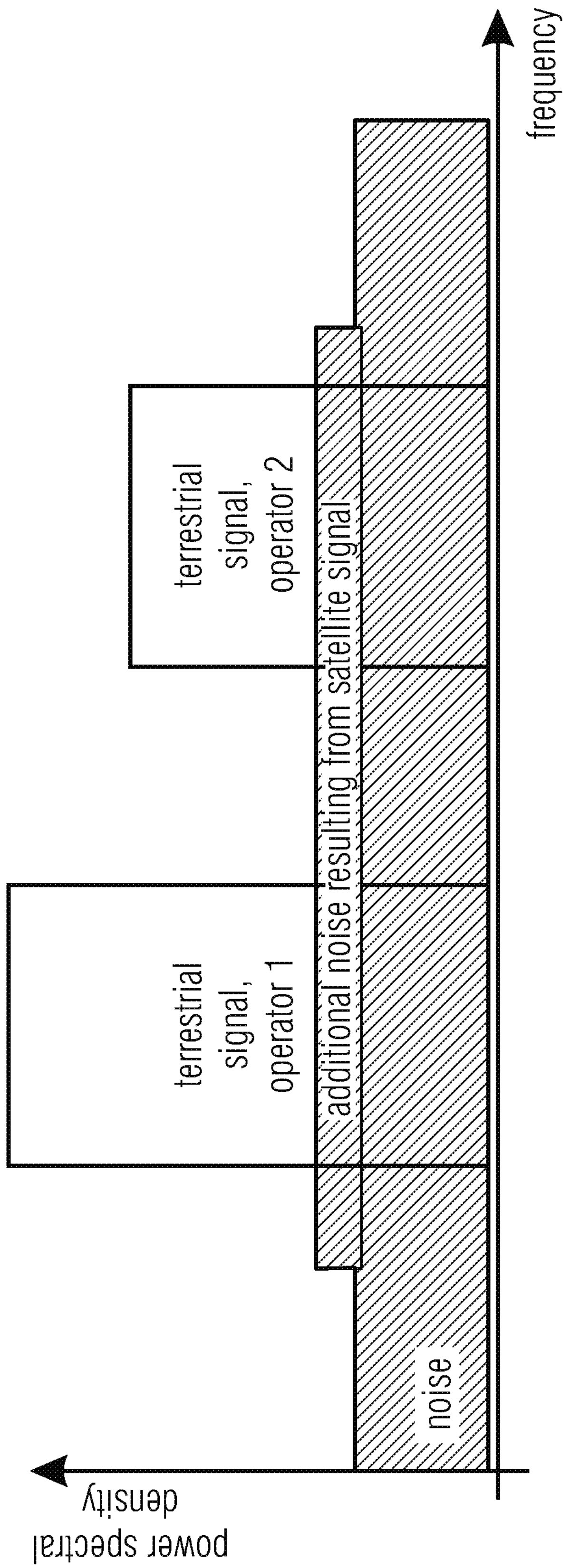
FIG. 8 illustrates an overall spectrum which may be shared by several operators, wherein satellites may use a higher bandwidth.

FIG. 8 illustrates an overall spectrum which may be shared by several operators, wherein satellites may use a higher bandwidth.

Figure 9:
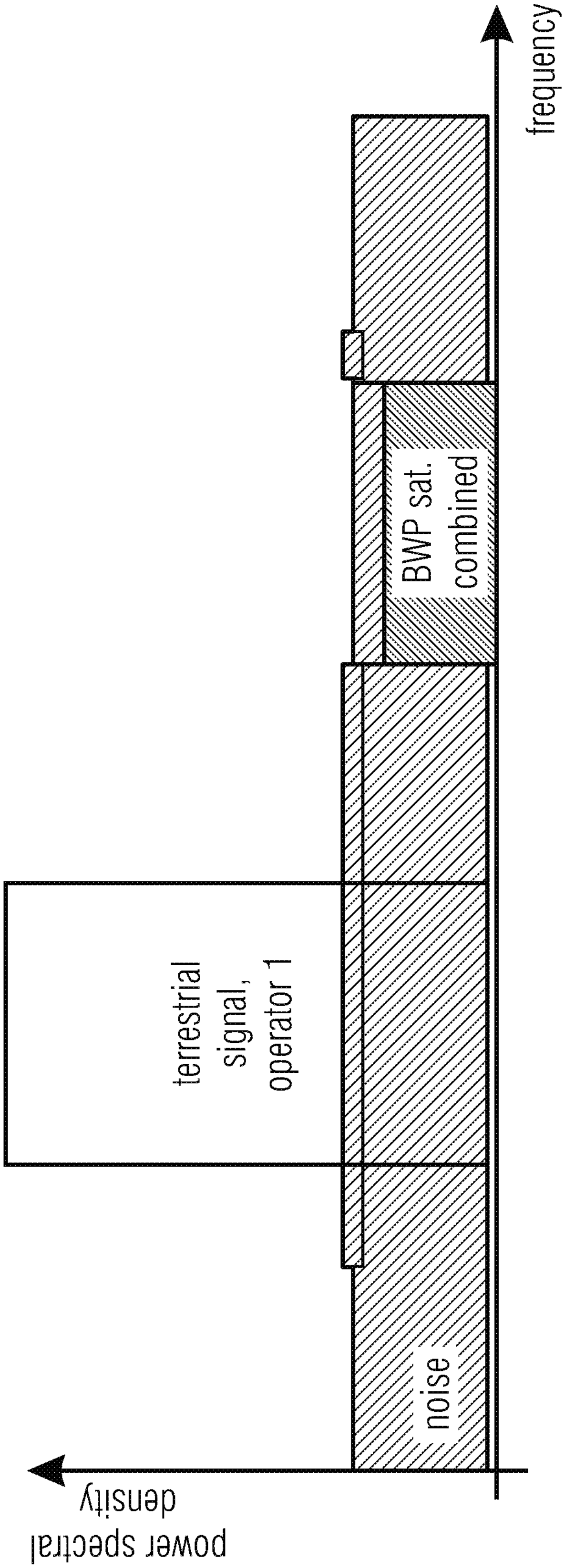
FIG. 9 compare the signal charateristics for an area with strong terrestrial signal and an overlap area. For the two areas different bandwidth parts (BWPs) may be used. For the overlap area optional combining of a satellite and a terrestrial signal may be applied.

FIG. 9 illustrates an overlap area of an optional combining of a satellite and a terrestrial signal.

For the spectrum sharing, different scenarios are considered.

In a first scenario, the satellite and terrestrial signal use the same bandwidth and the same center frequency. A coordination of the content of the signal transmitted from the satellite and from the terrestrial TRP is only required for the data targeting UEs in the overlap area.

In a second scenario, a satellite uses a higher bandwidth and/or several terrestrial operators may use parts of the spectrum.

If the bandwidth of the satellite signal and the spectrum used by the terrestrial signal is different, the 5G standard supports two options.

As a first option, the implementation is based on the carrier aggregation principle.

The satellite signal is split into several independent carrier inline with TS38.101. Each carrier includes its own control channel transmitted in the "control region" (for 5G this is called "CORESET"). Carrier aggregation is illustrated, for example, in TS 38.101, FIG. 5.3A.3-1 of TS38.101-1, Release 17, v17.1.0. It depicts a definition of aggregated channel bandwidth for intra-band carrier aggregation.

Figure 10:
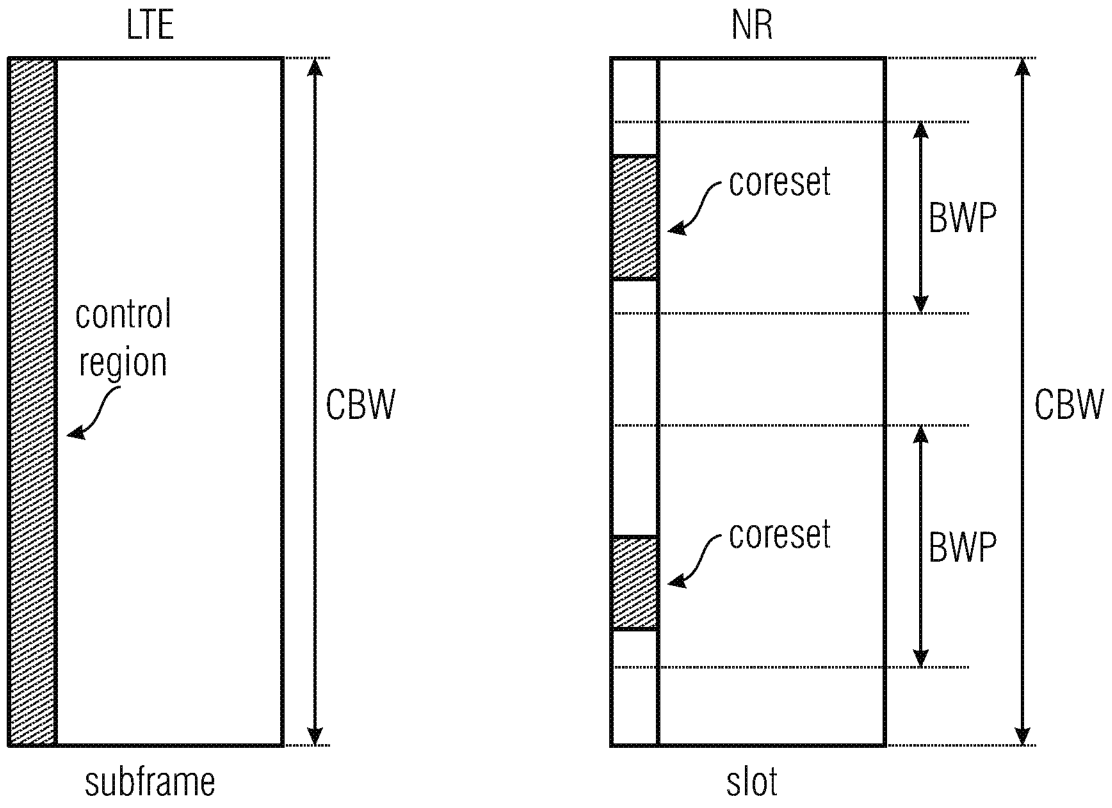
FIG. 10 illustrates an allocation of control information for bandwidth parts. 5G (NR) allows to place in each bandwidth part related control information.
Figure 11:
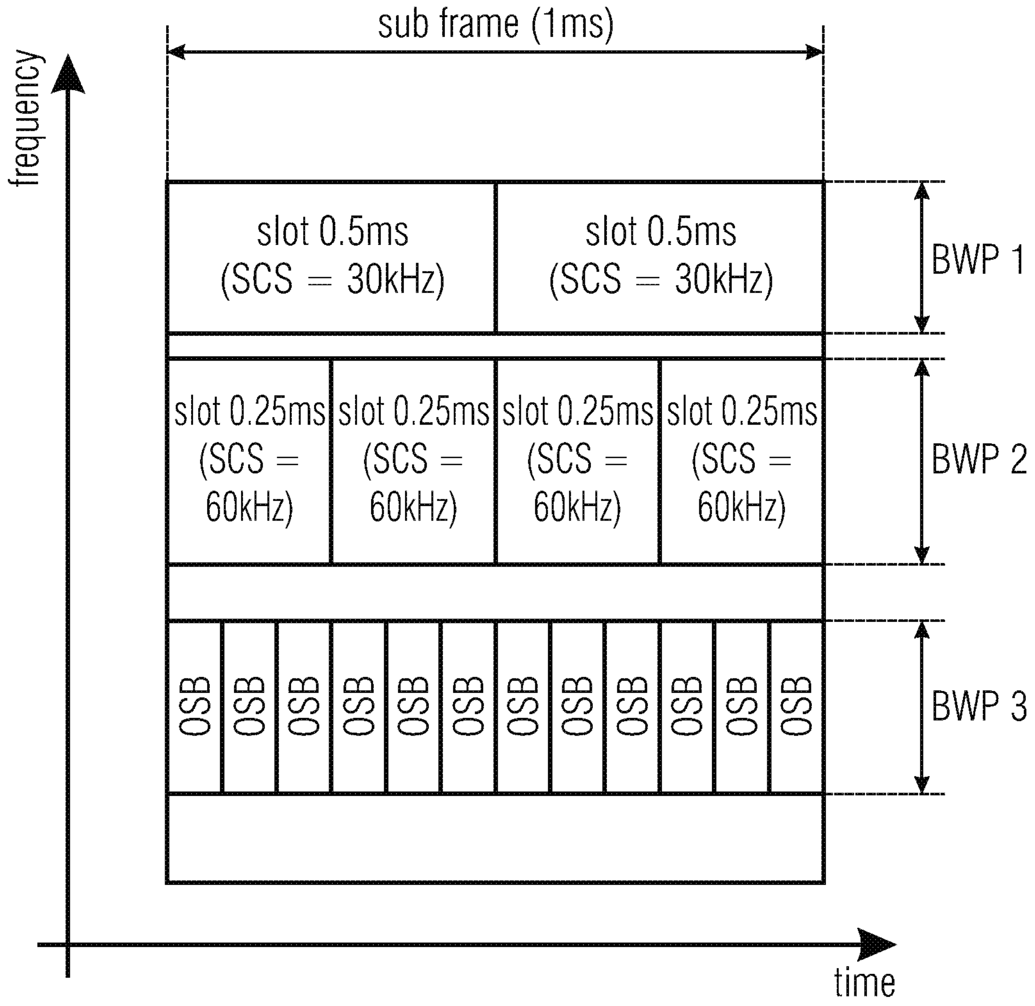
FIG. 11 illustrates an example for using different configurations (OFDM parameters) per BWP.

As a second option, the terrestrial signal is considered as bandwidth part (BWP) of the satellite signal. The terrestrial and satellite signals may need sum further coordination (synchronization to a common reference, allocation of the control channels for the BWPs, etc.). To make the BWPs independent each BWP has to include control information. The 5G standard allows to transmit the CORESET in different BWPs. This allows that for the "terrestrial only area" and the "satellite only area" the signals are more or less independent (except the synchronization to a common framing and the signaling of the location of the CORESET). Only for the overlap area further coordination between the control entity for terrestrial signal and the satellite signal is required. FIG. 10 illustrates an allocation of control information for bandwidth parts. Using this principle, it may be even possible to use for the terrestrial and the satellite signal different OFDM parameters ("numerologies") or slot formats. For the 5G standard a 10 ms frame is split in ten 1 ms sub-frames (see also above). The number of slots per subframe depends on the subcarrier spacing (SCS). For 15 kHz subcarrier spacing a subframe includes 1 slot with 14 OFDM symbols (normal mode) or 12 OFDM symbols (extended cyclic prefix). For higher subcarrier spacing a subframe is split in several slots. For 30 kHz a subframe includes 2 slots 0.5 ms each, for 60 kHz 4 slots 0.25 ms each and so on. The principle of the OSB essentially regroups the OFDM symbols belonging to a slot or a group of slots. For example, for a SCS of 60 kHz a subframe may include 12 OSB bundles, 5 OFDM symbols each. The total number of OFDM symbol per subframe of 1 ms is 60 OFDM symbols. Alternatively, a subframe may include 4 slots with the same SCS of 60 kHz. Each slot includes 14 (or 12 in case of extended CP) OFDM symbols (56 (or 48) OFDM symbols per subframe). Another BWP may use a lower SCS (e.g. 30 kHz). In this case a subframe include 2 slots with 14 (or 12) OFDM symbols each resulting in 28 or 24 per subframe. The principle is depicted in FIG. 11. It is technical feasible and partly already supported by the standard to support different configuration ("numerologies") per BWP. This allows to select the parameters according the application or UE type/characteristics (further examples see "medium SINR scenarios" below). FIG. 11 illustrates an example for using different numerologies per BWP.

Figure 12:
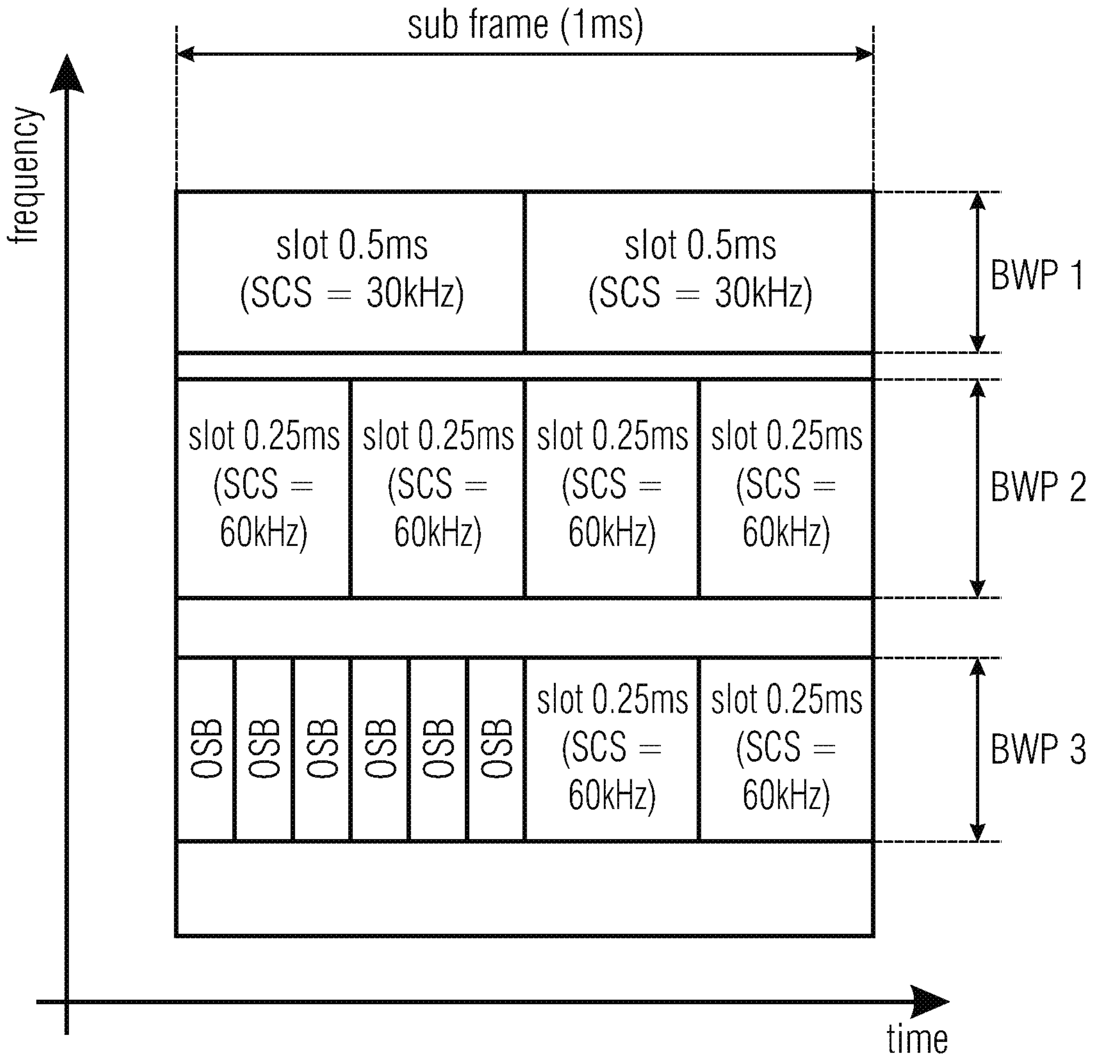
FIG. 12 illustrates a dynamic change of the slot format.

The common framing of the "numerologies" may allow even changing the slot or subframe format on frame-by-frame basis (see FIG. 12).

FIG. 12 illustrates a dynamic change of the slot format, in particular, BWP3 changes from OSB format to the normal slot format.

The features may be subject of UE capabilities or implementation constraints. For example, a UE may be able to decode only one BWP or a guard time is required between different configurations.

Supporting different configurations for the BWPs allows the selection of parameters (including subframe format) for each bandwidth part according the propagation conditions (expected delay spread, SINR, etc.). BWPs for terrestrial only may select parameter according the terrestrial propagation conditions, whereas for the BWPs selected for satellite reception the parameters are selected according the satellite link characteristics. Only for BWPs designated for satellite/terrestrial combining (overlap area) a common parameter set is selected.

In some embodiments, the concept allows the following operation modes:

In one operation mode, the UE is located in an area without terrestrial coverage, and the full spectrum may be used by the satellite for UEs in this area.

In another operation mode, the UE is located in an area with good terrestrial coverage, and the low power flux density of the satellite signal may slightly increase the noise floor. The impact to the terrestrial signal may be negligible.

In a further operation mode, the UE is located in an area with satellite and terrestrial coverage and may be able to receive both signals. One or more first parts of the spectrum may, e.g., be used for "terrestrial only" One or more second parts of the spectrum may, e.g., be used for satellite direct reception the content of this part may be different from the content of the terrestrial signal. For one or more third parts of the spectrum, a terrestrial/satellite combining and seamless handover may, e.g., be supported. This is applicable to the overlap area. The feature supporting satellite/terrestrial combining allows also terrestrial reinforcement of satellite signal for indoor reception, for example, or areas with bad satellite coverage (e.g. urban environment). This satellite/terrestrial combining concept is known from so-call "satellite based hybrid systems" using terrestrial repeaters and was proposed for broadcast systems with mixed terrestrial/satellite coverage. The embodiment may add these features to 5G compliant frame structure allowing a flexible assignment of the capacity to different service.

Regarding a low SINR operation, terrestrial, supporting lower SINR may allow to extend the coverage. This may be attractive for areas with low UE density (low system capacity requirements) or for emergency cases (e.g. increase coverage in case of gNB failures). A repetition factor of 4 will give a gain of 6 dB, for example. The resulting extension of the coverage radius depends on the environment. For free space propagation conditions a gain of 6 dB doubles the coverage radius (fourfold area).

In the following, medium SINR scenarios with low delay spread are considered.

At first, satellite reception is considered.

Figure 13:
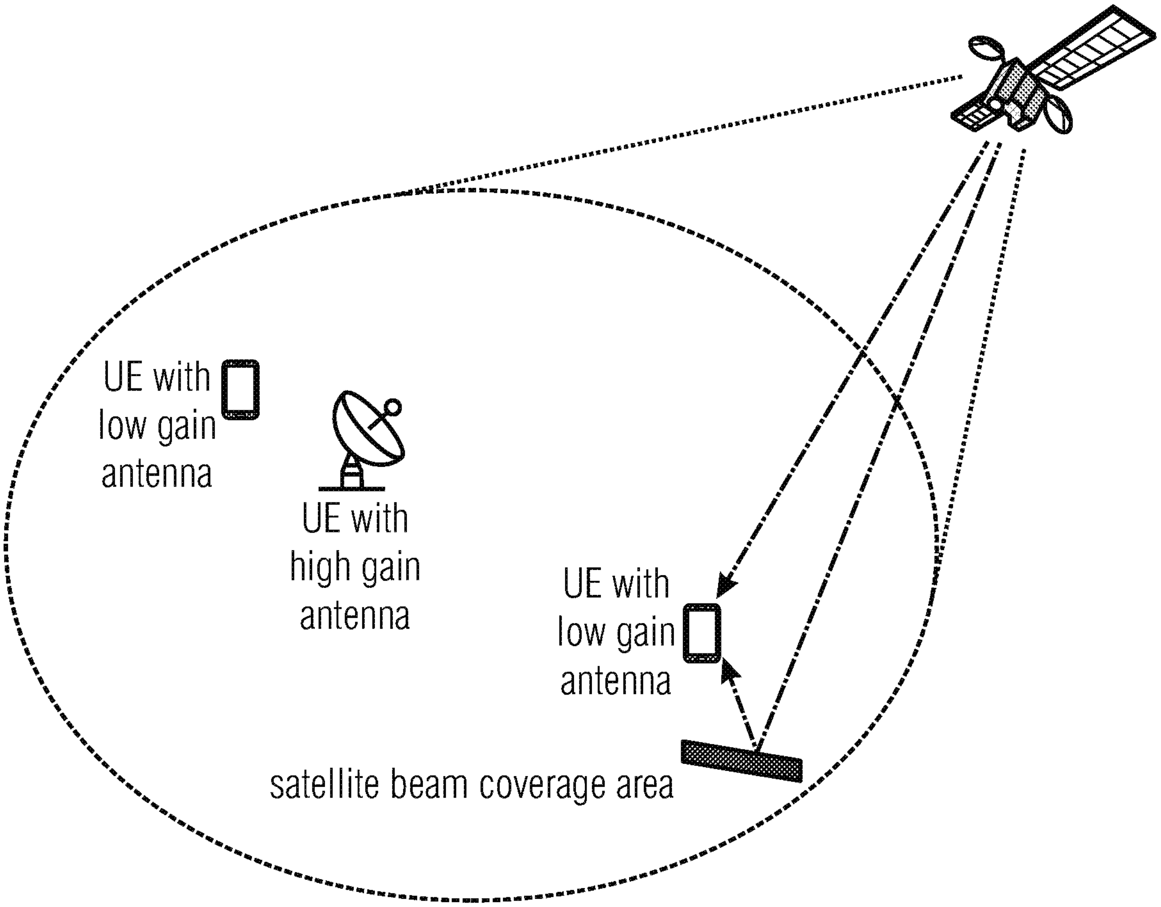
FIG. 13 illustrates mixed UE types.

FIG. 13 illustrates mixed UE types.

The delay spread depends partly also on the antenna characteristics. If antennas with high directivity (e.g. satellite dish) are used the delay spread is reduced or multipath components are cancelled out nearly complete. UEs with low gain antenna (lower directivity) may also receive reflected signals, resulting in a higher delay spread. The OSB structure offers sufficient flexibility to utilize both UE types. It is even possible to serve a plurality of UEs in one slot using frequency multiplex/bandwidth parts.

As a first example we assume the satellite spectral density is equal for all types of UEs (for satellite based systems the allowed power flux density may be limited by regulatory constraints). For BWPs (or sub-carriers) targeting UEs with low gain antenna different modulation and FEC code parameter are selected as for BWPs targeting UEs with high gain antenna. The principle is depicted in FIG. 14 and FIG. 15.

Figure 14:
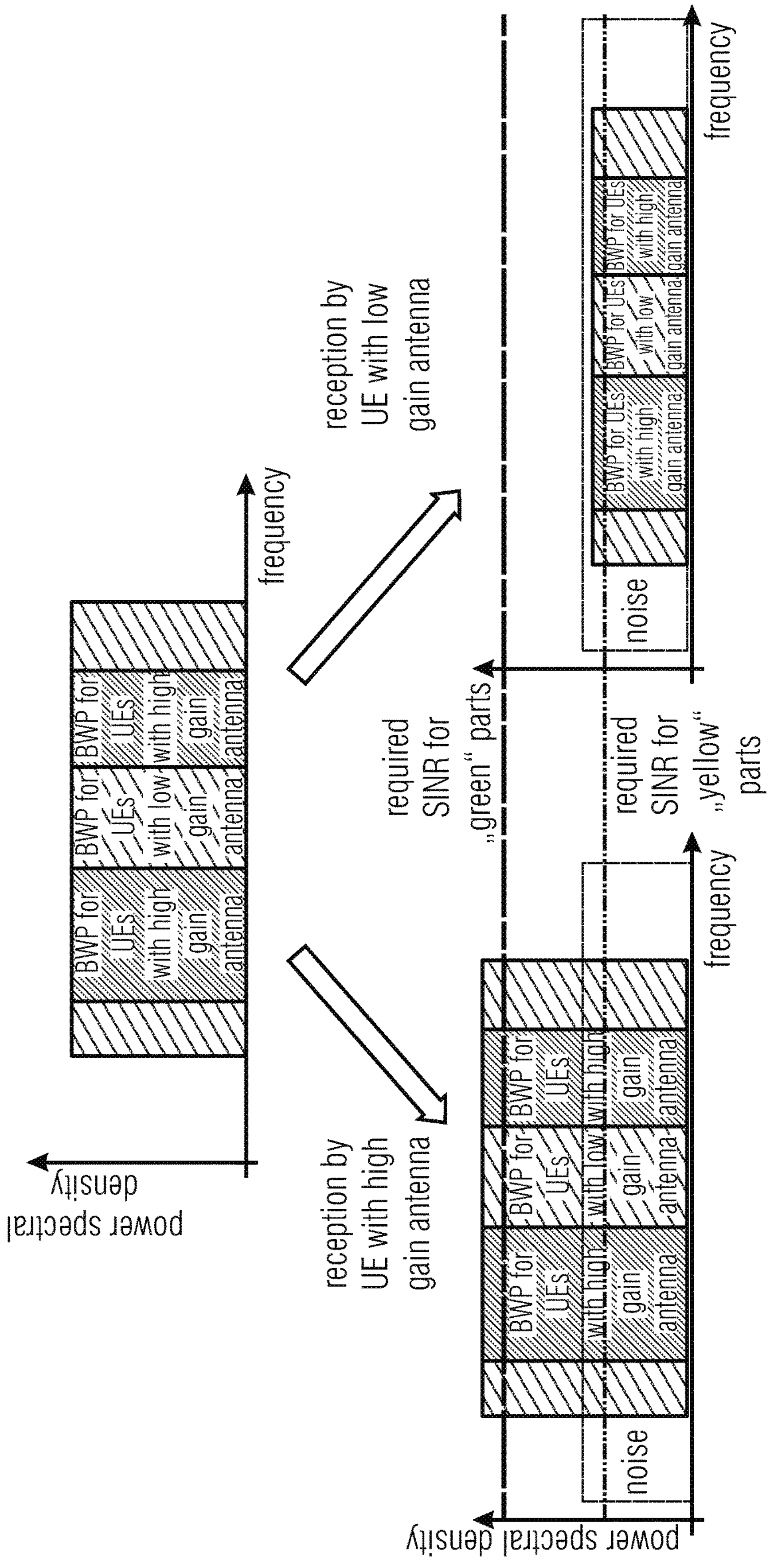
FIG. 14 illustrates a sharing of a spectrum for different UE types.

FIG. 14 illustrates a sharing of a spectrum for different UE types.

Figure 15:
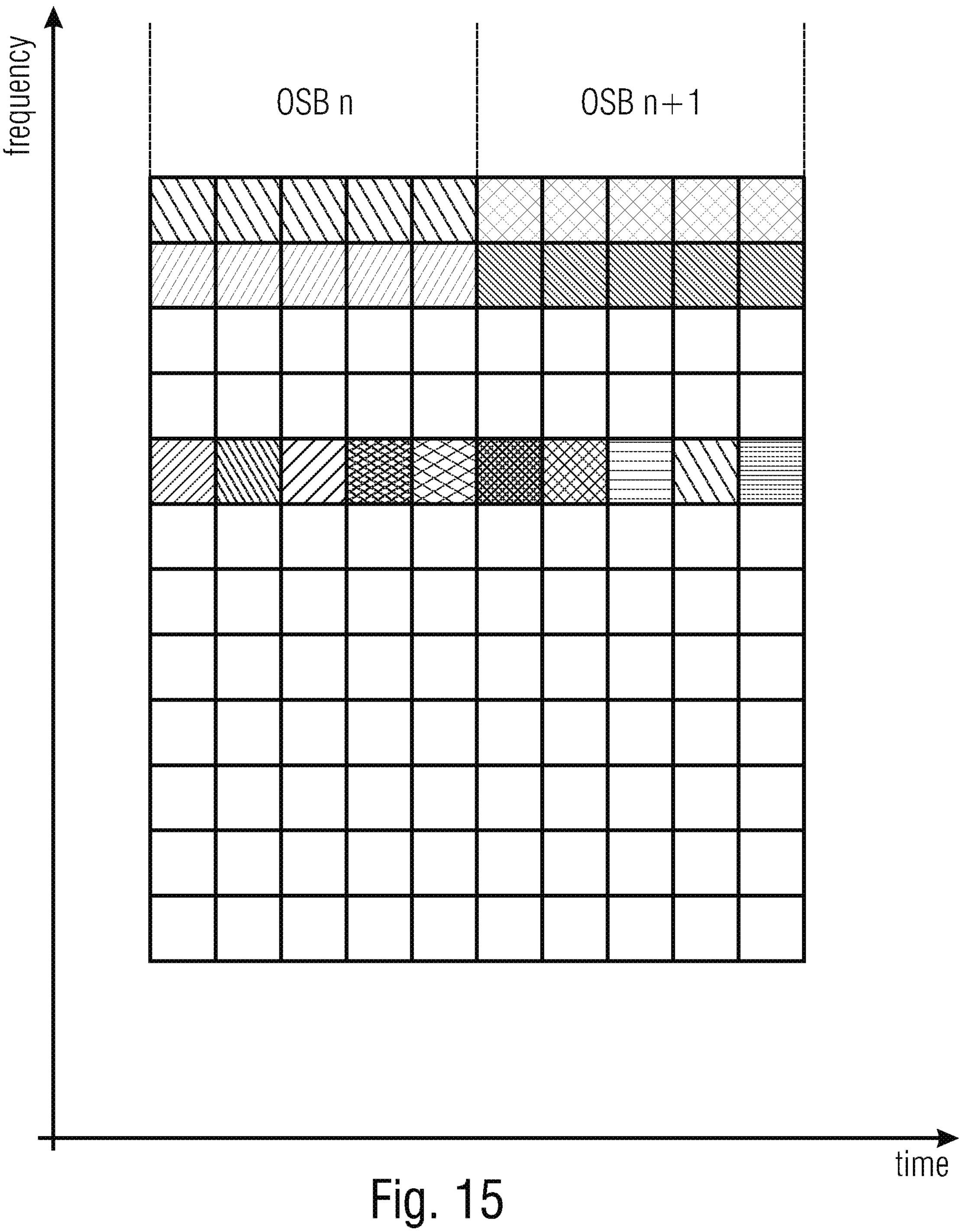
FIG. 15 illustrates a principle of OSB (OFDM symbol bundle) with combined use of OSB for different UE types.

FIG. 15 illustrates a principle of OSB with combined use of OSB for different UE types. Each square represents one subcarrier per OFDM symbol or a group of subcarrier (BWP).

In the example, 5 OFDM symbols are used for a bundle. For the sub carriers (SC) targeting UEs with high gain antennas OFDM symbols without cyclic prefix are used, hence each symbol may include different data in these SC (marked in different colors in FIG. 15). For the SC targeting UEs with low gain antennas repetition is used. All symbols include the same content for this SC (marked with same colors in FIG. 15). The first symbol of a bundle can be considered as CCP (allowing a demodulation with low symbol timing accuracy or removing the intersymbol interference between OSBs).

Based on the BWP feature a first embodiment may use different bandwidth parts for different UE types. FIG. 11 is also applicable to different terminal types. In the example the BWP1 and BWP2 may be applicable to terminals with high gain antennas using the slot format as already covered by the 5G standard. BWP3 may target UEs with low gain antennas.

Figure 16:
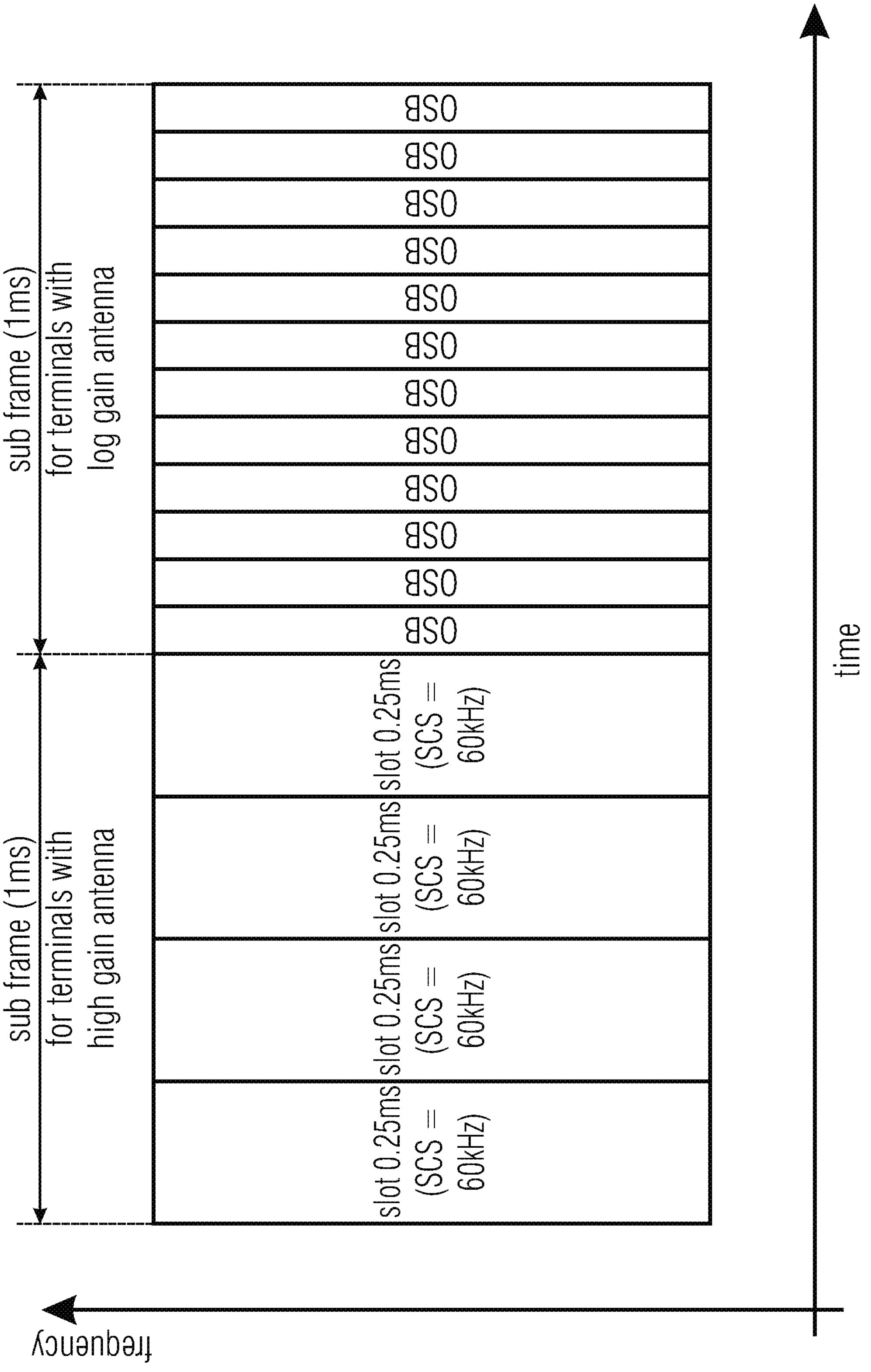
FIG. 16 illustrates a time multiplex of slots according to 5G standards, release 16 and slot containing OSB.

In another embodiment, time multiplex may, e.g., be employed. FIG. 16 shows a multiplex switching the frame structure with a granularity of one subframe. In particular, FIG. 16 illustrates a time multiplex of "normal frames" and of "OSB frames". Alternatively, switching at slot level may be applied.

In the following, a wide band positioning slot (WPS) is considered.

For communication purpose the CP reduces the intersymbol interference in case of multipath propagation. Typically, the CP length is selected according to the expected delay spread. For the selection of the OFDM parameters typically the following trade-offs has to be taken into account.

A lower SCS results in a longer symbol duration what results in a lower overhead for the CP assuming a given delay spread. But: A low SCS makes the system very sensitive to frequency offsets.

A higher SCS is less sensitive to frequency offset and Doppler spread or Doppler shifts what results in a shorter symbol duration what further results in a higher overhead for CP if a the same delay spread is utilized.

For positioning applications, the situation is different:

The key parameter is the sequences length (=number of used REs). Instead of a long OFDM symbols several short OFDM symbols can be used. The sum of the REs assigned to one positioning reference signal may be identical.

If shorter OFDM symbols are used the SCS will be increased and the system is more robust to frequency offsets.

If a sequence of identical OFDM symbols is used an additional OFDM symbol is added as CP. L−1 OFDM symbol may be used for demodulation and the required symbol timing accuracy is +/−0.5*fft_length.

For the demodulation different options are possible, for example, to demodulate each OFDM symbol individually and combine after demodulation; or to demodulate the symbol with an effective FFT-Length of (L−1)*FFT_length of the symbol.

As an example, three possible configurations of SRS symbols are compared, where all use the same number of REs, the same bandwidth and the same time duration of the SRS, but different sub carrier spacings (SCS).

| | Low SCS | Medium SCS | High SCS |
|---|---|---|---|
| Bandwidth | 100 MHz | 100 MHz | 100 MHz |
| SCS | 30 kHz | 60 kHz | 120 kHz |
| nbSym = OFDM symbols per SRS (example) | 2 | 4 | 8 |
| FFT_length | 4096 | 2048 | 1024 |
| Total duration without CP | 0.0667 ms = 1/fs*FFT_length*nbSym | 0.0667 ms | 0.0667 ms |
| nbRB = number of used RB | 256 (max is 272) | 128 | 64 |
| $K_{TC}$ = COMB factor | 2 | 2 | 2 |
| REs per OFDM symbol | 1536 (=nbRB*12/ $K_{TC}$) | 768 | 384 |
| Sequence length = Total number of REs for nbSym | 3072 | 3072 | 3072 |

Table 4 compares an SRS configuration with the same number of REs, but different SCS Using a bundle of OFDM symbols without cyclic prefix in between and repetition has advantages.

The orthogonality of the sub-carrier is maintained, even with non-ideal symbol timing. This is especially essential if different notes share the OFDM symbols using COMB multiplex and the symbols arrive with different power and/or different offset related to the ideal symbol timing and this offset exceed the cyclic prefix length and/or for critical multipath scenarios or the demodulator is not able to achieve ideal symbol timing recovery.

The OFDM symbols of a bundle may, e.g., be decoded individually and a frequency offset compensation can be performed before combining the symbols.

can be used to generate a positioning signal with a higher bandwidth. Carrier aggregation (and coordination of the WPS allocation for the individual carrier) can be applied to utilize the high bandwidth. Different configurations according the embodiment are provided in the following table. The WPS configuration is compared to a normal slot format in line with the 3GPP standard.

| Parameter | Normal slot | WPS Example 1 | WPS Example 2 | Comments |
|---|---|---|---|---|
| SCS | 30 kHz | 60 kHz | 120 kHz | The SCS defines also the required frequency estimation accuracy (e.g. 5 . . . 10% of the SCS) |
| Maximum bandwidth for FFT-length 4096 | 100 MHz | 200 MHz | 400 MHz | App. 80% of the sub-carrier are used. The remaining 20% are used for the "guard band" |
| Slot duration | 0.5 ms | 0.5 ms | 0.5 ms | |
| OFDM symbols per slot | 14 | 30 | 60 | |
| CP length | 2.34 microsec. | 0 | 0 | |
| Maximum OFDM symbol timing offset | 2.34 microsec | 16.7 microsec | 8.33 microsec | For the WPS the effective CP length is one OFDM symbol |
| Shortest SRS | 35.67 microsec | 33.3 microsec | 16.66 microsec | For the WPS the shortest SRS covers two OFDM |
| | symbols | | | |
| Maximum number of SRS per slot (without cyclic shift multiplex) | 14* $K_{TC}$ | 15*$K_{TC}$ | 30* $K_{TC}$ | $K_{TC}$ is the COMB factor For the WPS a minimum length of 2 OFDM symbols is assumed. |
| Staggered SRS | Possible | Possible | Possible | For the WPS n*L OFDM symbols are used for "staggering over n symbols". |

In case of an OFDM symbols bundle with CCP the effective CIR excess delay is defined by the length of the CCP.

The CCP is longer (assuming the same overhead for CPs) than an individual CP per OFDM symbol. This offers more flexibility for the trade-off sub-carrier spacing versus cyclic prefix length and related overhead.

For positioning applications, it may be worthwhile to use for the slot comprising positioning reference signal a OFDM symbol bundle (called WPS) optimized for positioning applications:

The network may, e.g., configure a timeslot used as WPS. The UE may, e.g., be configured to transmit within this time-slot an uplink positioning reference signal (e.g. SRS for positioning (SRS-P)).

For the WPS a different numerology (different SCS spacing) may, e.g., be selected. The SRS-P may, e.g., use several OFDM symbols.

Each OFDM symbol may, for example, be identical (e.g., USB with repetition code).

A CCP or an additional OFDM symbol may, e.g., be added in case of high delay offset (between OFDM symbols transmitted by different notes (UEs or TRP) and/or non-ideal symbol timing and/or channels with high multipath delays. In this case it may, for example, be sufficient to synchronize the decoding window position (OFDM symbol timing) with reduced accuracy or a timing advance adjustment with lower accuracy is sufficient.

The same concept may e.g., be used for a downlink PRS also.

In a second example a WPS concept may, e.g., be used to support a higher bandwidth for the positioning signal. Subcarrier spacings and channel bandwidths considered for FR2

Table 5 compares configurations with same FFT length, but different SCS resulting in different bandwidth In the following, sharing of the WPS by several UEs according to embodiments is described.

To minimize the number of WPS required for a given number of UEs or gNBs, several UEs or several gNBs may share the WPS(=transmit in the same time slot).

The 5G standard supports several methods for resource allocation and sharing, for example, in the frequency domain, wherein he UEs use different COMB-Offsets; and/or, for example, in the time domain, where the WPS includes several OFDM symbols. A subset is assigned to the UE; and/or, for example, in the code domain, where different PN-Sequences are assigned. When, for example, UEs use the same code, the same OFDM symbols and the same COMB offset, separation is supported by assigning different cyclic shifts.

As a first example (example 1; high dynamic range example) the following is assumed:

SCS=60 kHz (resulting in 30 OFDM symbols per slot)

$K_{TC}$=6 (resulting in six fully orthogonal groups)

Full staggering ($K_{TC}$*L=6*L symbols are assigned to one PRS). A very high processing gain due to long sequence (very low SINR supported) is achieved. Moreover, ambiguity cancellation in case of cyclic shifts is possible.

L=5

No code multiplex

4 UEs share the same resource elements and are separated by cyclic shift only, thus a maximum distance difference separated by cyclic shift is ¼ OFDM symbol duration=4.1 microseconds ≙ 1230 m (Timing advance offsets not considered)

Resulting from this, 24 UEs (6 groups, 4 UEs per group) can share the slot.

Alternatively, 24 TRPs can share the same slots for a downlink PRS.

Figure 17:
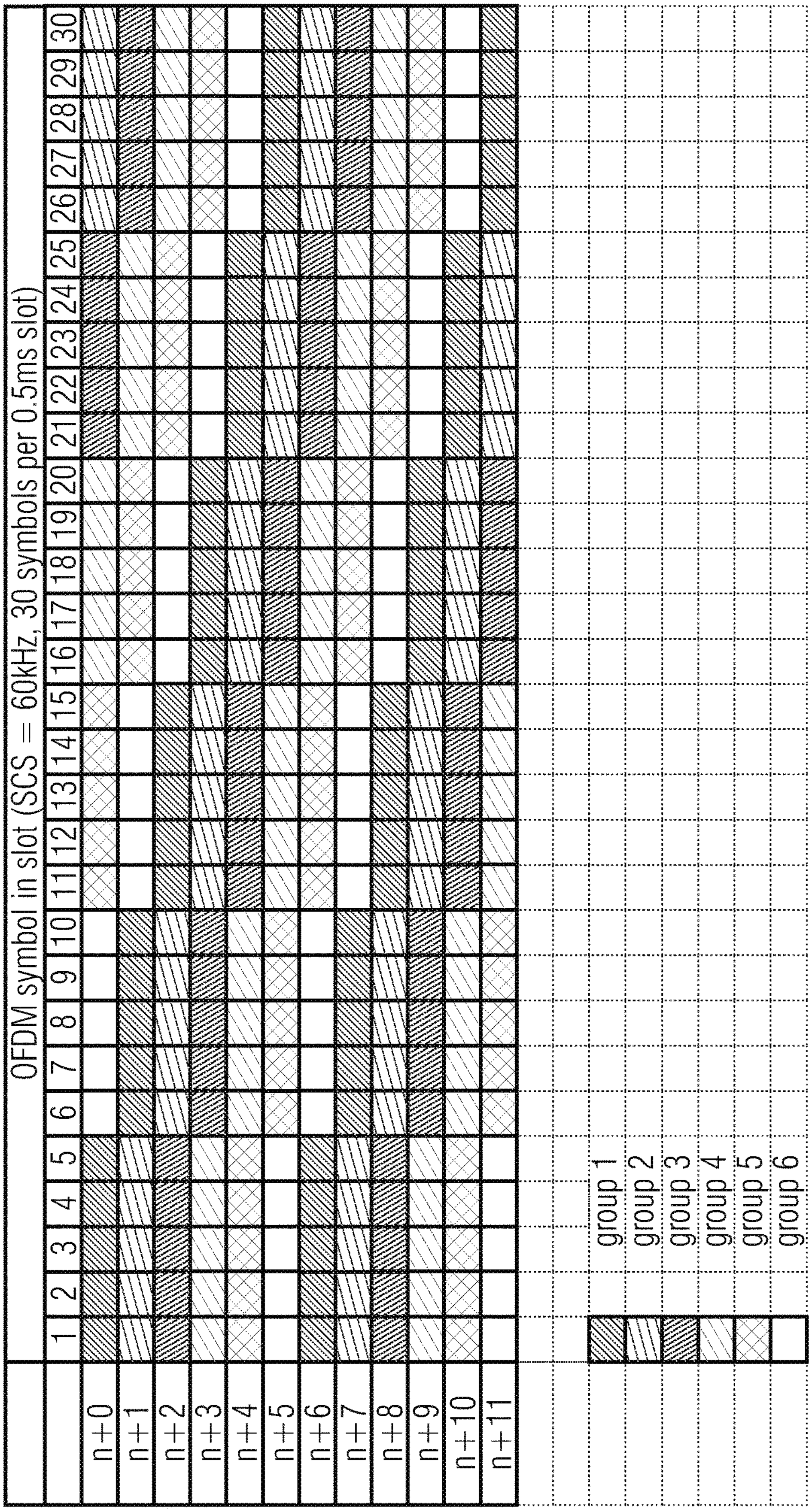
FIG. 17 illustrates a first example for a resource allocation pattern with "staggered OSB". Different UEs may use different COMB offsets.

FIG. 17 illustrates the first example (example 1) for a resource allocation pattern (assuming a resource block with 12 sub-carrier and 30 OFDM symbols).

Assuming 200 MHz (FR2 or 2 adjacent carriers are used, for example) the following key parameter results:

Number of used sub carriers (SC): 3264 of 4096 (FFT length) (e.g. 272 resource blocks with 12 SC)

Number of RE elements per OFDM symbol used for one UE group (=PN sequences length): 272*2=544 resulting in a processing gain per OFDM symbol: 27 dB Assuming 4 of 5 OFDM symbols are combined: Additional gain from repetition: 6 dB Staggering gain (Power boosting gain): 7.8 dB. Assuming the same overall power is assigned to an OFDM symbol COMB structure in combination staggering/destaggering (combine the 6 bundles) allowes a 7.8 dB higher power per subcarrier.

Resulting from that, the theoretical processing gain assuming full coherent combining is 48.6 dB (40.8 dB without power boosting gain). This achieves that very weak signals can be detected.

The second example (example 2) is a time multiplex only example. The following is assumed:

SCS=60 kHz (resulting in 30 OFDM symbols per slot)

$K_{TC}$=1 (no COMB multiplex)

No staggering

L=5

Time multiplex only (6 groups, 5 symbols each per slot)

No code multiplex

4 UEs share the same resource elements and are separated by cyclic shift only

If cyclic shifts are used the maximum distance difference separated by cyclic shift is 1/numberOfCyclicShift of the OFDM symbol duration (=¼ if the OFDM symbol duration for the example with 4 cyclic shift steps=4.1 microseconds ≙ 1230 m (timing advance offsets not considered).

Figure 18:
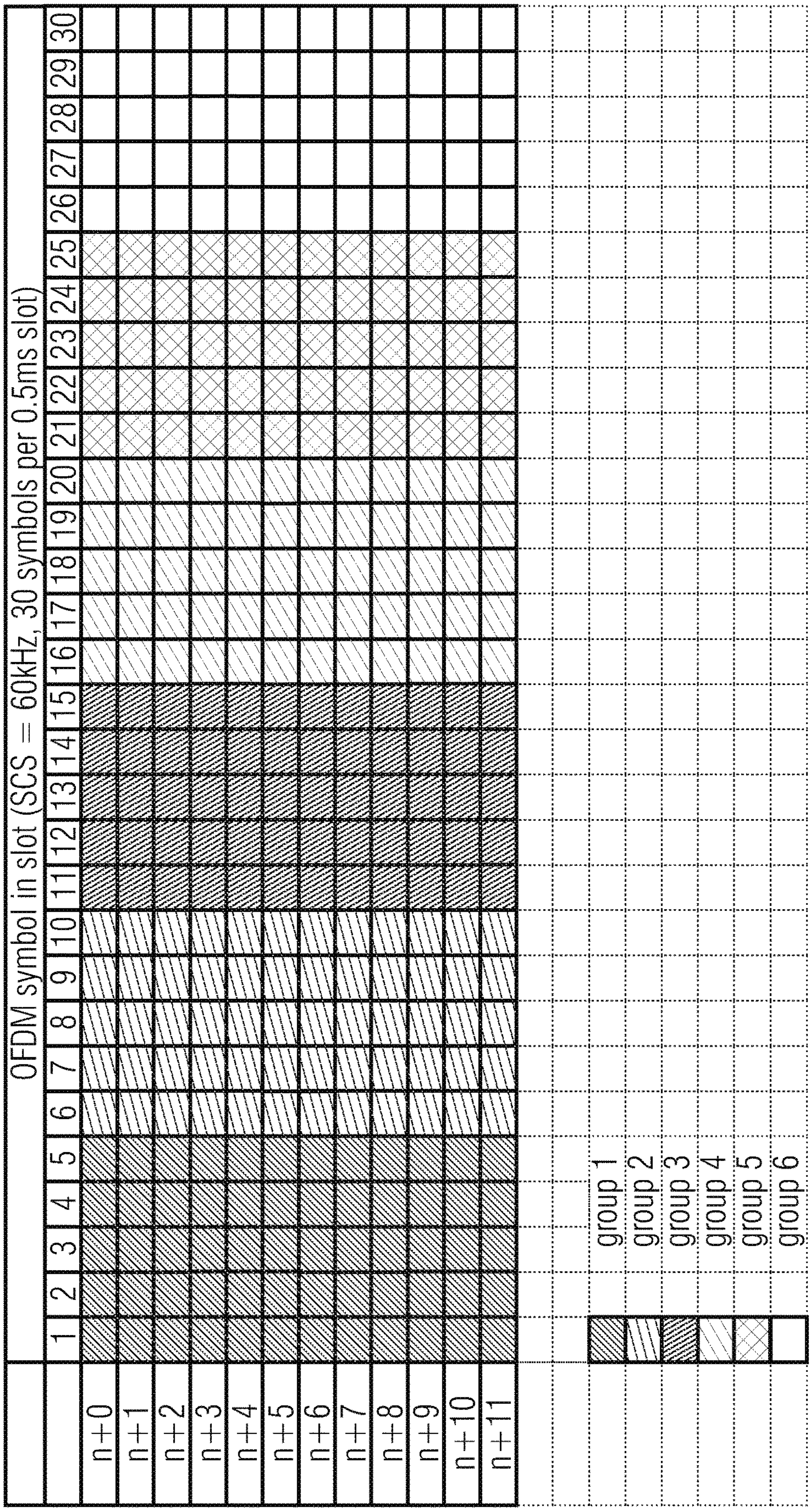
FIG. 18 illustrates a second example for a resource allocation pattern. Different UEs share the slot as time multiplex.

FIG. 18 illustrates a second example (example 2) for a resource allocation pattern (time multiplex of the groups).

Assuming 200 MHz (2 adjacent carriers are used) the following key parameter results:

Number of used sub carriers (SC) used: 3264 (e.g. 272 resource blocks with 12 SC)

Number of RE elements per OFDM symbol used for one UE group (=PN sequences length): 3264: processing gain per OFDM symbol: 35 dB Assuming 4 of 5 OFDM symbols are used, the additional gain from repetition is 6 dB Staggering gain: not applicable Resulting from this, the theoretical processing gain assuming full coherent combining is 41 dB. Thus, very weak signals can be detected.

Advantages of the concept are that the groups remain orthogonal with non-ideal timing advance setting (note: An ideal timing advance setting is possible for one gNB only). This allows that signals with very high level difference can be separated. Thus, a simplified power control procedure can be applied. Due to the higher SCS higher frequency offsets are allowed. Cyclic shifts for CAZAC sequences allow that several UEs share the same Res.

Regarding the first example (example 1), the use of staggering increases the effective sequence length (higher processing gain) and reduces the ambiguity issues resulting from cyclic shift in combination with COMB structure.

In the following, the support of different bandwidth and carrier aggregation according to an embodiment is described.

As described above, table 5 compares the bandwidth for a given FFT length. Just changing the sampling frequency for a given parameter set is an efficient method for supporting high bandwidth. Changing the sampling frequency results in a shorter symbol duration. For positioning applications, the effective cyclic prefix length become critical in this case. The OSB structure solves this issue.

Figure 19:
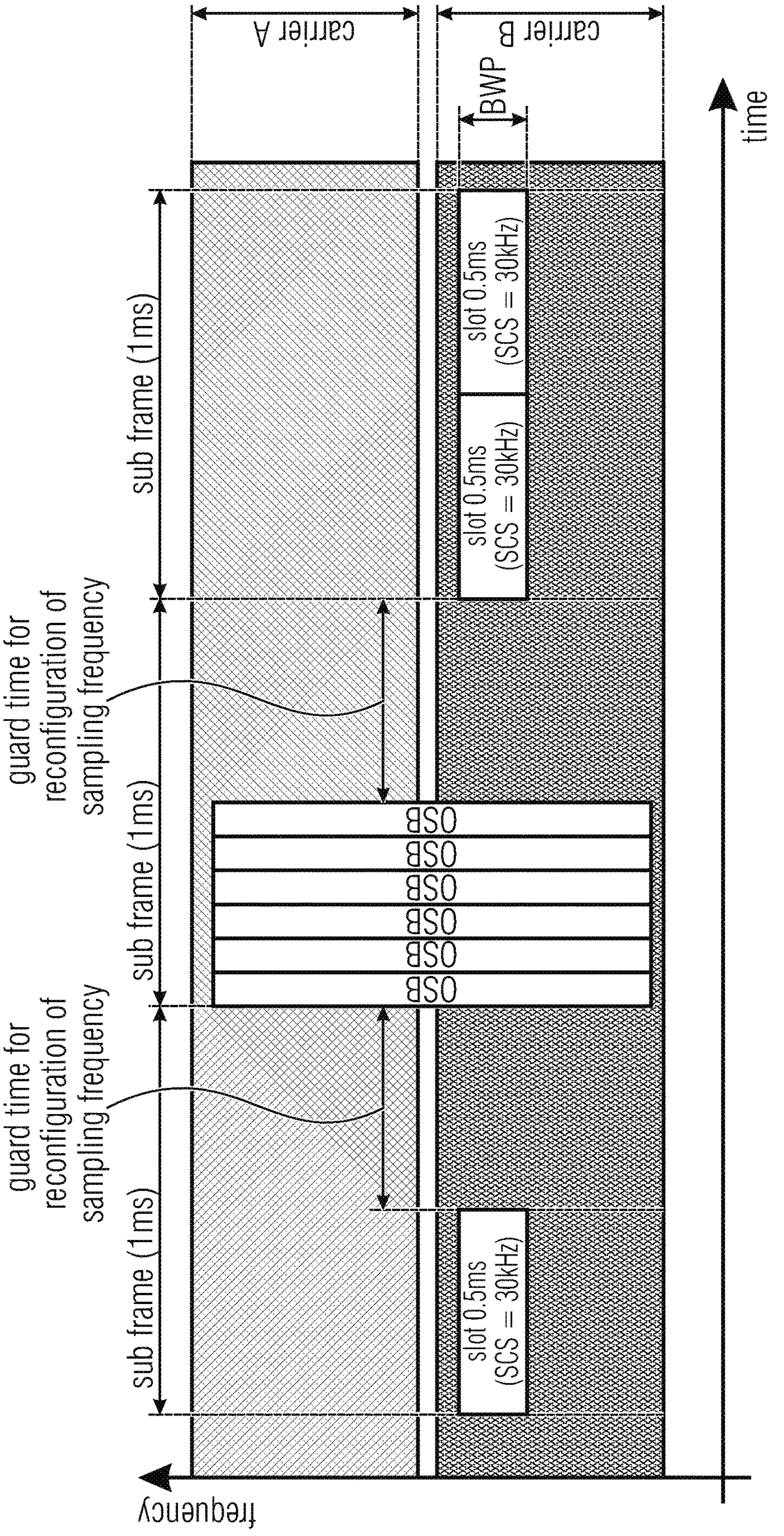
FIG. 19 illustrates an example for bandwidth switching. OSB is used to insert wideband signals for positioning purpose, whereas for data BWPs with lower bandwidth are use.

FIG. 19 illustrates an example for bandwidth switching. The UE may operate within a BWP of carrier B. For the positioning signal the UE may be temporally configured for a higher bandwidth. The higher bandwidth may occupy the full bandwidth of carrier B or even a higher bandwidth (e.g. the bandwidth or parts of the bandwidth of the adjacent carrier A as shown in FIG. 19). Due to hardware constraints a guard time may be required between the different configurations. Furthermore, the extension of the bandwidth needs coordination between the RRC entities for Carrier A and Carrier B.

For the example a slot with 6 OSB for UL-PRS signals in line with configurations depicted in FIG. 17 or FIG. 18 is assumed. This slot may be shared by many UEs as explained above.

In the following, further embodiments of the present invention are described.

Some embodiments provide an OSB structure.

A method for determining a slot structure in a wireless communication system by a first node is provided. The method comprises:

Identifying a slot configuration comprising a plurality of OFDM symbols.

Determining the cyclic prefix (CP) parameters associated with a bundle of the OFDM symbols for the slot configuration; wherein at least one OFDM symbol in the slot is not directly preceded by a CP.

Selecting the slot structure for communication data, control and/or positioning depending on the determined slot configuration.

According to some embodiments, OFDM symbols are grouped to a "bundle".

Within the bundle no cyclic prefix is used.

A common cyclic prefix (CCP) may be added at the begin of a bundle

According to an embodiment, repetition may be used for the OFDM symbols of a bundle In an embodiment, the repetition may, for example, be applied to a subset of the sub-carrier only.

According to an embodiment, the CCP length may have the length of a OFDM symbol.

In an embodiment, the CCP length may, e.g., be selected according the length of the channel impulse response.

According to an embodiment, the CCP length may, e.g., be selected to align the OSB structure with the 5G frame structure.

In an embodiment, a slot may, e.g., include an integer number of OSBs and the length of n OSBs is compliant to the 5G frame structure.

According to an embodiment, the OSB may include a positioning reference signal (PRS).

In an embodiment, several OSBs may be assigned to one PRS.

According to an embodiment, if the PRS includes several OSBs different COMB offsets may be applied to each OSB ("staggering").

In an embodiment, an OSB bundle may, e.g., be assigned to links with low delay spread.

According to an embodiment, different slots may, e.g., include different OSB structures (or no OSB structure).

According to an embodiment, the CCP may, e.g., remove the inter symbol interference between bundles. Within a bundle inter-symbol interference (if relevant) is removed by other means (e.g. iterative decoding).

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 20:
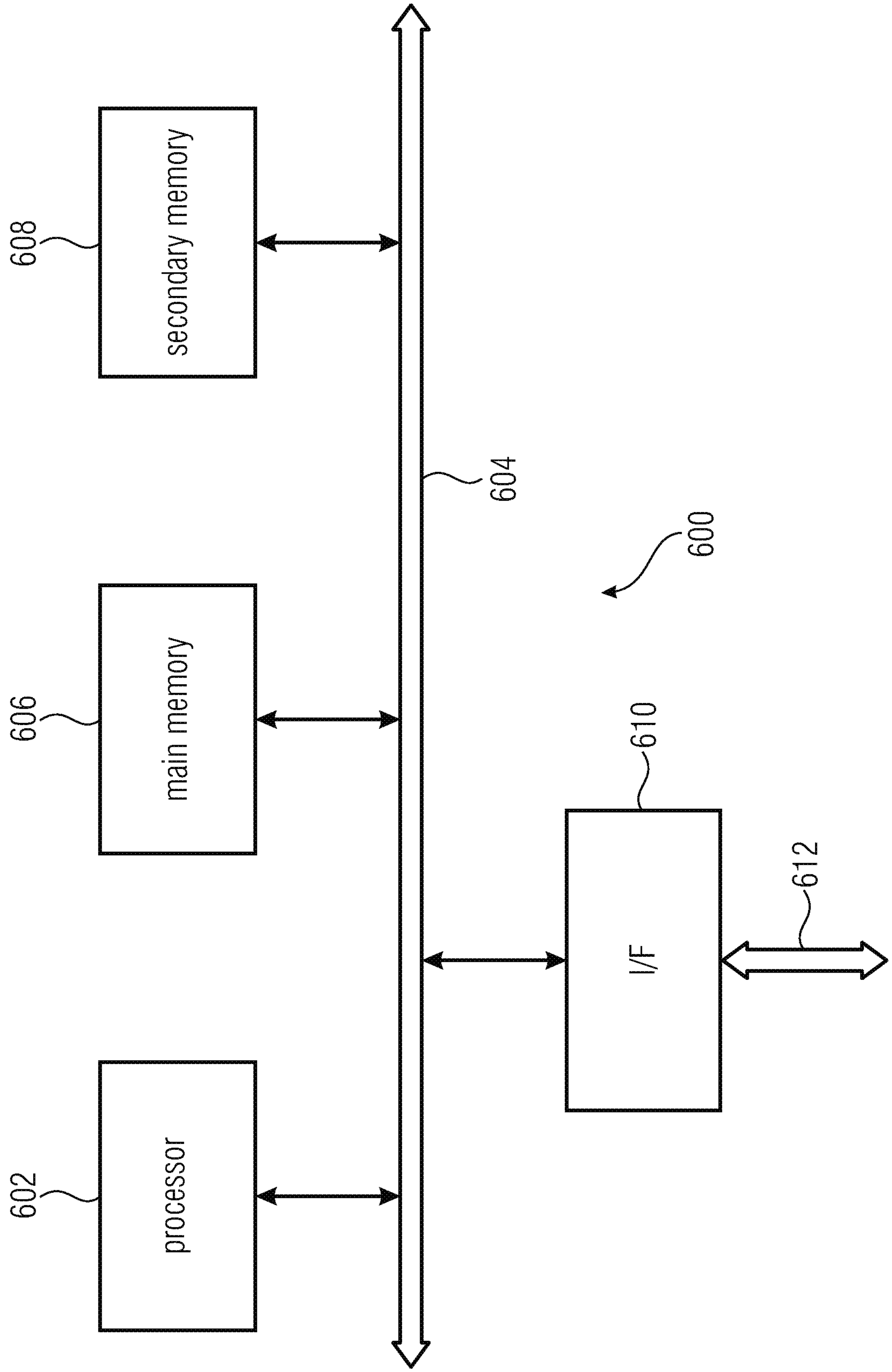
FIG. 20 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 20 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms “computer program medium” and “computer readable medium” are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein are apparent to others skilled in the art. It is the intent, therefore, to be limited only by the scope of the impending patent claims and not by the specific details presented by way of description and explanation of the embodiments herein.

REFERENCES

| | |
|---|---|
| RRC | TS38.331 v16.1.0 |
| LPP | TS37.355 v16.1.0 |
| NRPPa | TS38.455 v16.0.0 |

ABBREVIATIONS

| Abbreviation | Definition |
|---|---|
| 3GPP | third generation partnership project |
| 5GC | 5G core network |
| BS | base station |
| CSI-RS | channel state information reference signal |
| DMRS | demodulation reference signal |
| DOA | direction of arrival |
| E-CID | enhanced cell ID |
| eNB | evolved node b |
| E-SMLC | evolved serving mobile location center. |
| E-UTRA | evolved UMTS terrestrial radio access |
| gNB | next generation node-b |
| GPS | Global Positioning System |
| LMF | location management function |
| LMU | location measurement unit |
| LPP | LTE positioning protocol |
| LTE | Long-term evolution |
| NG | next generation |
| ng-eNB | next generation eNB |
| NG-RAN | either a gNB or an ng-eNB |
| NR | new radio |
| NRPPa | new radio positioning protocol a |
| OTDOA | observe time difference of arrival |
| PRS | position reference signal |
| PTRS | phase tracking reference signal |
| QCL | quasi colocation |
| RAN | radio access network |
| RP | reception point |
| RSTD | reference signal time difference |
| RTOA | relative time of arrival |
| RTT | round trip time |
| SA | Standalone |
| SRS | sounding reference signal |
| TDM | Time Domain Multiplexing |
| TOF | time of flight |
| TRP | transmission reception point |
| RS | reference signal |
| QCL | quasi co-located |
| AoA | Angle of Arrival |
| AoD | Angle of Departure |
| PAS | Power Angular Spectrum |
| NR | New Radio |

The invention claimed is:

1. A first user equipment for receiving data in a wireless communication system, wherein the first user equipment is configured to receive a positioning reference signal over one or more resources, wherein the first user equipment is one of a plurality of user equipments of the wireless communication system, wherein each of the plurality of user equipments is assigned to a group of two or more groups, wherein each of the plurality of groups comprises two or more of the plurality of user equipments, wherein the first user equipment is configured to receive a configuration message indicating, for each resource element of a plurality of resource elements, which group of the two or more groups is to access said resource element, wherein the first user equipment is configured to receive the positioning reference signal, and is configured to access only those of the plurality of resource elements to which the user equipment belongs according to the configuration information.

2. A first user equipment according to claim 1, wherein the plurality of resource elements are resource elements for wideband positioning.

3. A first user equipment according to claim 1, wherein the two or more user equipments of a group of the two or more groups, which share a same resource element of the plurality of resource elements, are separated by a cyclic shift.

4. A first user equipment according to claim 1, wherein the two or more user equipments of a group of the two or more groups, which share a same resource element of the plurality of resource elements, are separated by different sequences.

5. A first user equipment according to claim 1, wherein each of the plurality of resource elements belongs to a subcarrier of a plurality of subcarriers and to an OFDM symbol of a plurality of OFDM symbols, wherein the configuration message specifies, for each resource element of the plurality of resource elements, which group of the two or more groups is to access said resource element, according to a configuration scheme, by assigning, for each OFDM symbol of the plurality of OFDM symbols, each subcarrier of the plurality of subcarriers to a group of the two or more groups.

6. A first user equipment according claim 5, wherein, for each OFDM symbol of the plurality of OFDM symbols, for each group of the two or more groups, at least one of the plurality of subcarriers is assigned to said group by the configuration scheme.

7. A first user equipment according to claim 6, wherein an assignment of the subcarriers to the two or more groups is changed by the configuration scheme.

8. A first user equipment according to claim 7, wherein the assignment of the subcarriers to the two or more groups is changed by the configuration scheme periodically with respect to a number of OFDM symbols.

9. A first user equipment according claim 8, wherein, for each OFDM symbol of the plurality of OFDM symbols, all subcarriers are assigned by the configuration scheme to a same group of the two or more groups.

10. A first user equipment according to claim 1, wherein the first user equipment is configured to receive the positioning reference signal via a sidelink.

11. A network entity for a wireless communication system, wherein the network entity is configured to transmit a configuration message over one or more first resources to a plurality of user equipments of the wireless communication system, wherein the configuration message comprises configuration information indicating one or more second resources, wherein the configuration information is suitable to be employed by the plurality of user equipments for receiving a positioning reference signal over the one or more second resources, wherein each of the plurality of user equipments is assigned to a group of two or more groups, wherein each of the plurality of groups comprises two or more of the plurality of user equipments, wherein the configuration message specifies, for each resource element of a plurality of resource elements, the user equipments of which group of the two or more groups shall access said resource element.

12. A network entity according to claim 11, wherein the network entity is a base station.

13. A network entity according to claim 11, wherein the plurality of resource elements are resource elements for wideband positioning.

14. A network entity according to claim 11, wherein the two or more user equipments of a group of the two or more groups, which share a same resource element of the plurality of resource elements, are separated by a cyclic shift.

15. A network entity according to claim 11, wherein the two or more user equipments of a group of the two or more groups, which share a same resource element of the plurality of resource elements, are separated by different sequences.

16. A network entity according to claim 11, wherein each of the plurality of resource elements belongs to a subcarrier of a plurality of subcarriers and to an OFDM symbol of a plurality of OFDM symbols, wherein the configuration message specifies, for each resource element of the plurality of resource elements, which group of the two or more groups is allowed to access said resource element, according to a configuration scheme, by assigning, for each OFDM symbol of the plurality of OFDM symbols, each subcarrier of the plurality of subcarriers to a group of the two or more groups.

17. A network entity according claim 16, wherein, for each OFDM symbol of the plurality of OFDM symbols, for each group of the two or more groups, at least one of the plurality of subcarriers is assigned to said group by the configuration scheme.

18. A network entity according to claim 17, wherein an assignment of the subcarriers to the two or more groups is changed by the configuration scheme.

19. A network entity according to claim 18, wherein the assignment of the subcarriers to the two or more groups is changed by the configuration scheme periodically with respect to a number of OFDM symbols.

20. A network entity according claim 16, wherein, for each OFDM symbol of the plurality of OFDM symbols, all subcarriers are assigned by the configuration scheme to a same group of the two or more groups.

21. A network entity according to claim 11, wherein the configuration information is suitable to be employed by the plurality of user equipments for receiving a positioning reference signal via sidelink.

22. A wireless communication system, comprising:
a first user equipment according to claim 1, and
a network entity according to claim 11,
wherein the network entity is configured to transmit the configuration message to the first user equipment.

23. A method for receiving data by a first user equipment in a wireless communication system,
wherein the first user equipment receives a positioning reference signal over one or more resources,
wherein the first user equipment is one of a plurality of user equipments of the wireless communication system,
wherein the first user equipment is assigned to a group of two or more groups, wherein each of the plurality of groups comprises two or more of the plurality of user equipments,
wherein the first user equipment receives a configuration message indicating, for each resource element of a plurality of resource elements, which group of the two or more groups is to access said resource element,
wherein the first user equipment receives the positioning reference signal, and is configured accesses only those of the plurality of resource elements to which the user equipment belongs according to the configuration information.

24. A method for a wireless communication system,
wherein a network entity transmits a configuration message over one or more first resources to a plurality of user equipments of the wireless communication system, wherein the configuration message comprises configuration information indicating one or more second resources, wherein the configuration information is suitable to be employed by the plurality of user equipments for receiving a positioning reference signal over the one or more second resources,
wherein each of the plurality of user equipments is assigned to a group of two or more groups, wherein each of the plurality of groups comprises two or more of the plurality of user equipments,
wherein the configuration message specifies, for each resource element of a plurality of resource elements, the user equipments of which group of the two or more groups shall access said resource element.

25. A non-transitory digital storage medium having a computer program stored thereon to perform a method for receiving data by a first user equipment in a wireless communication system,
wherein the first user equipment receives a positioning reference signal over one or more resources,
wherein the first user equipment is one of a plurality of user equipments of the wireless communication system,
wherein the first user equipment is assigned to a group of two or more groups, wherein each of the plurality of groups comprises two or more of the plurality of user equipments,
wherein the first user equipment receives a configuration message indicating, for each resource element of a plurality of resource elements, which group of the two or more groups is to access said resource element,
wherein the first user equipment receives the positioning reference signal, and is configured accesses only those of the plurality of resource elements to which the user equipment belongs according to the configuration information,
when said computer program is run by a computer.

26. A non-transitory digital storage medium having a computer program stored thereon to perform a method for a wireless communication system,
wherein a network entity transmits a configuration message over one or more first resources to a plurality of user equipments of the wireless communication system, wherein the configuration message comprises configuration information indicating one or more second resources, wherein the configuration information is suitable to be employed by the plurality of user equipments for receiving a positioning reference signal over the one or more second resources,
wherein each of the plurality of user equipments is assigned to a group of two or more groups, wherein each of the plurality of groups comprises two or more of the plurality of user equipments,
wherein the configuration message specifies, for each resource element of a plurality of resource elements, the user equipments of which group of the two or more groups shall access said resource element,
when said computer program is run by a computer.

* * * * *